United States Patent
Mohammad Mirzaei et al.

(10) Patent No.: US 10,049,327 B2
(45) Date of Patent: Aug. 14, 2018

(54) APPLICATION CHARACTERIZATION FOR MACHINE LEARNING ON HETEROGENEOUS CORE DEVICES

(71) Applicant: QUALCOMM Incorporated, San Diego, CA (US)

(72) Inventors: Faraz Mohammad Mirzaei, San Jose, CA (US); Vinay Sridhara, Santa Clara, CA (US); Nayeem Islam, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 587 days.

(21) Appl. No.: 14/680,225

(22) Filed: Apr. 7, 2015

(65) Prior Publication Data

US 2016/0171390 A1 Jun. 16, 2016

Related U.S. Application Data

(60) Provisional application No. 62/091,132, filed on Dec. 12, 2014, provisional application No. 62/091,290, filed on Dec. 12, 2014.

(51) Int. Cl.
*G06N 99/00* (2010.01)
*G06F 11/34* (2006.01)

(52) U.S. Cl.
CPC ....... *G06N 99/005* (2013.01); *G06F 11/3438* (2013.01); *Y02D 10/34* (2018.01)

(58) Field of Classification Search
CPC ....... G06N 99/005; G06F 11/34; G06F 3/048; Y02B 60/165

See application file for complete search history.

(56) References Cited

U.S. PATENT DOCUMENTS 5,884,244 A * 3/1999 Phaal ............... G06F 11/34
702/186
8,423,483 B2 4/2013 Sadeh-Koniecpol et al.
(Continued)

FOREIGN PATENT DOCUMENTS

EP 1548596 A1 6/2005

OTHER PUBLICATIONS

Ţăpuş, Cristian, I-Hsin Chung, and Jeffrey K. Hollingsworth. "Active harmony: Towards automated performance tuning." In Proceedings of the 2002 ACM/IEEE conference on Supercomputing, pp. 1-11. IEEE Computer Society Press, 2002.*
(Continued)

*Primary Examiner* — Vincent Gonzales
(74) *Attorney, Agent, or Firm* — The Marbury Law Group, PLLC

(57) ABSTRACT

Methods, devices, systems, and non-transitory process-readable storage media for a computing device to use machine learning to dynamically configure an application and/or complex algorithms associated with the application. An aspect method performed by a processor of the computing device may include operations for performing an application that calls a library function associated with a complex algorithm, obtaining signals indicating user responses to performance of the application, determining whether a user tolerates the performance of the application based on the obtained signals indicating the user responses, adjusting a configuration of the application to improve a subsequent performance of the application in response to determining the user does not tolerate the performance of the application, and storing data indicating the user responses to the performance of the application and other external variables for use in subsequent evaluations of user inputs.

28 Claims, 15 Drawing Sheets

(56) References Cited

U.S. PATENT DOCUMENTS

| | | |
|---|---|---|
| 8,706,652 B2 | 4/2014 | Yang et al. |
| 8,909,950 B1 | 12/2014 | Levchuk et al. |
| 2005/0125390 A1* | 6/2005 | Hurst-Hiller ..... G06F 17/30867 |
| 2011/0019693 A1 | 1/2011 | Fu et al. |
| 2012/0047509 A1 | 2/2012 | Ben-Itzhak |
| 2014/0195463 A1 | 7/2014 | Jacobs |
| 2014/0366042 A1 | 12/2014 | Chan et al. |
| 2015/0277971 A1* | 10/2015 | Young, III .......... G06F 9/44521 |
| | | 713/100 |

OTHER PUBLICATIONS

A. Krause et al., "Trading off prediction accuracy and power consumption for context-aware wearable computing", Proc. 9th Int'l Symp. on Wearable Computers, IEEE, 2005, 7 pages. (Year: 2005).*

International Search Report and Written Opinion—PCT/US2015/059928—ISA/EPO—dated Mar. 22, 2016.

* cited by examiner

400 

```
#pragma scientific_library deadline HardRealTime        /―402
scientific_library::algorithm(input, kernel, options);

#pragma scientific_library deadline SoftRealTime        /―404
scientific_library::algorithm(input, kernel, options);
                                                        /―406
#pragma scientific_library deadline OpportunisticBatterySaver
scientific_library::algorithm(input, kernel, options);

#pragma scientific_library deadline Seconds 15          /―408
scientific_library::algorithm(input, kernel, options);

#pragma scientific_library deadline Minutes 10          /―410
scientific_library::algorithm(input, kernel, options);
```

FIG. 4

APPLICATION CHARACTERIZATION FOR MACHINE LEARNING ON HETEROGENEOUS CORE DEVICES

RELATED APPLICATIONS

This application claims the benefit of priority to U.S. Provisional Application No. 62/091,290, entitled "Application Characterization for Machine Learning on Heterogeneous Core Devices" filed Dec. 12, 2014, as well as U.S. Provisional Application No. 62/091,132, entitled "Architecture for Improving Dynamic Execution of Complex Algorithms" filed Dec. 12, 2014, the entire contents of both of which are hereby incorporated by reference.

BACKGROUND

Many user device applications may utilize a collection of complex algorithms (also known as computational kernels). For example, a social media application may be configured to call libraries that solve linear systems, provide matrix multiplication, perform Eigenvalue decomposition, etc. Such complex algorithms typically require significant computing resources, and thus may greatly impact battery power and otherwise tax computing system resources when executed with highest execution speeds and/or precision settings. However, users may not always require the optimal execution (e.g., speed, accuracy, precision) of complex algorithms by applications running on their devices. For example, a user may tolerate a soft deadline for receiving results of a sorting algorithm in a social media application when he/she is otherwise occupied with other activities in the social media application (e.g., uploading, commenting, organizing, etc.). As another example, when a picture is taken to be uploaded to a social media site, the user may be writing a status along with the picture, and so may not care about a delay for face detection complex algorithms.

SUMMARY

Various aspects provide methods, devices, systems, and non-transitory process-readable storage media for dynamically configuring complex algorithms associated with applications executing on a computing device. An aspect method executed by a processor of the computing device may include operations for performing an application that calls a library function associated with a complex algorithm, obtaining signals indicating user responses to performance of the application, determining whether a user tolerates the performance of the application based on the obtained signals indicating the user responses, adjusting a configuration of the application to improve a subsequent performance of the application in response to determining the user does not tolerate the performance of the application, and storing data indicating the user responses to the performance of the application and other external variables for use in subsequent evaluations of user inputs. In some aspects, the performance of the application includes at least one of an execution speed to achieve results, an accuracy of the results, and a precision of the results. In some aspects, the method may further include adjusting the configuration of the library function to decrease the subsequent performance of the application in response to determining the user tolerates the performance of the application.

In some aspects, the obtained signals indicating the user responses are one or more of touch inputs on a touch screen, button presses, data from sensors, a launch of another application, a change in a state of the application, and an absence of a user input when a user response would be expected. In some aspects, determining whether the user tolerates the performance of the application based on the obtained signals indicating the user responses may include one or more of determining whether the user has ignored output of the application based on the obtained signals, and determining whether the user has corrected the output of the application based on the obtained signals. In some aspects, determining whether the user tolerates the performance of the application based on the obtained signals indicating the user responses may include one or more of determining whether the user has navigated away from the application based on the obtained signals, and determining whether the user has pressed a refresh functionality or repeatedly pressed other buttons based on the obtained signals.

In some aspects, the method may further include determining whether the user has navigated back to the application in response to determining the user has navigated away from the application based on the obtained signals. In some aspects, the method may further include determining whether the user has navigated back to the application within a predefined time threshold in response to determining the user has navigated back to the application. In some aspects, adjusting the configuration of the application to improve the subsequent performance of the application in response to determining the user does not tolerate the performance of the application may include one or more of increasing a precision setting, increasing an execution speed setting, and changing an execution core setting.

In some aspects, adjusting the configuration of the application to improve the subsequent performance of the application in response to determining the user does not tolerate the performance of the application may include adjusting the configuration of the application for using the library function in response to determining the user does not tolerate the performance of the application. In some aspects, the method may further include adjusting the configuration of the application to lower the subsequent performance of the application in response to determining the user does tolerate the performance of the application. In some aspects, the application may call a plurality of library functions, wherein the library function may be within the plurality of library functions, and the method may further include selecting a first library function of the plurality of library functions, adjusting a configuration of the first library function to improve the subsequent performance of the application in response to determining the user does not tolerate the performance of the application based on the obtained signals indicating the user responses, subsequently performing the application, obtaining subsequent signals indicating subsequent user responses to the subsequent performance of the application, selecting a second library function of the plurality of library functions in response to determining the user does not tolerate the subsequent performance of the application, and adjusting a configuration of the second library function.

In some aspects, the method may further include obtaining a plurality of trade-off settings for the application, evaluating conditions associated with the computing device at an initial time, and determining whether a trade-off setting of the obtained plurality of trade-off settings is to be utilized based on the evaluated conditions associated with the computing device at the initial time. In some aspects, the method may further include adjusting an initial configuration of the application based on the trade-off setting in response to determining that the trade-off setting is to be utilized based on the evaluated conditions associated with the computing device at the initial time. In some aspects, adjusting the configuration of the application to improve the subsequent performance of the application in response to determining the user does not tolerate the performance of the application may include overwriting the initial configuration of the application in response to determining that the user does not tolerate the performance of the application using the initial configuration. In some aspects, obtaining the plurality of trade-off settings for the application may include at least one of obtaining a first trade-off settings for the application via an application programming interface (API) call during run-time of the application, obtaining a second trade-off settings for the application via an in-code directive, and obtaining a third trade-off settings for the application via a special register. In some aspects, evaluating conditions associated with the computing device at the initial time may include at least one of evaluating a workload for the application, and evaluating external conditions affecting processing of the application by the computing device.

Further aspects include a computing device configured with processor-executable instructions for performing operations of the methods described above. Further aspects include a non-transitory processor-readable medium on which is stored processor-executable instructions configured to cause a computing device to perform operations of the methods described above. Further aspects include a communication system including a computing device configured with processor-executable instructions to perform operations of the methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

FIG. 4 is a diagram illustrating a set of exemplary directives (i.e., pragma) suitable for use with various aspects.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to any one or all of cellular telephones, smart-phones, web-pads, tablet computers, Internet enabled cellular telephones, Wi-Fi® enabled electronic devices, personal data assistants (PDA's), laptop computers, personal computers, and similar electronic devices equipped with at least a processor. For example, mobile communication devices (e.g., smart-phones) may be considered mobile computing devices. Further, computing devices may utilize various cores or processors that each may have various capabilities and configurations (i.e., heterogeneous cores), such as application processors, graphics processing units (GPUs), digital signal processors (DSPs), etc. Such computing devices may be referred to herein as "multicore devices."

Figure 1A:
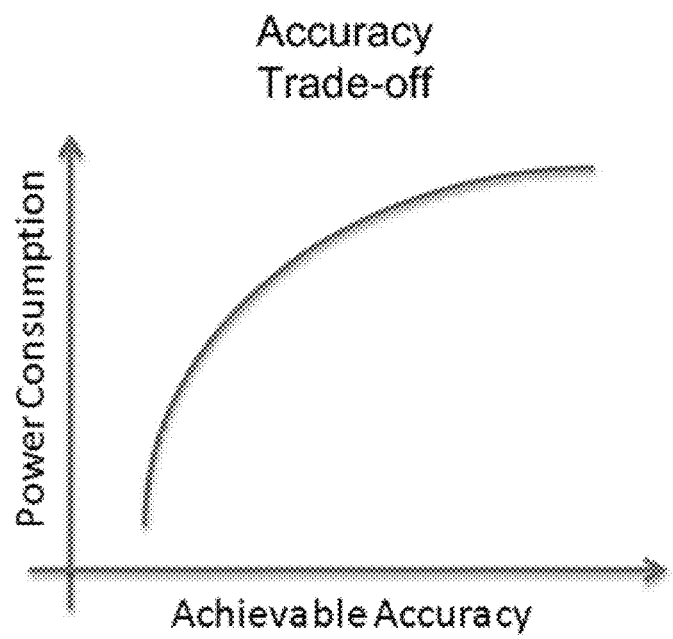
FIGS. 1A-1B are graphs (e.g., Pareto optimality graphs) illustrating general relationships between power consumption and accuracy and run-time speed configurations for complex algorithms.
Figure 1B:
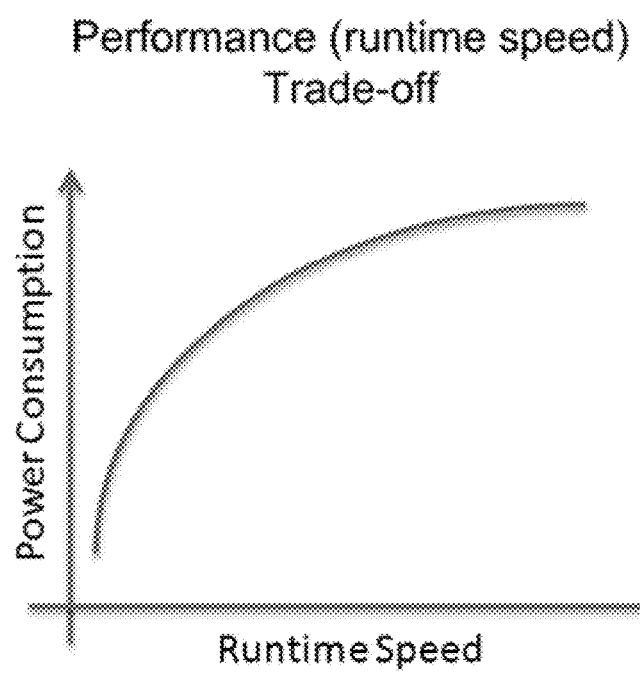

In general, many scientific algorithms (e.g., matrix multiplication, vector math, curve fitting, etc.) are computationally intensive, leading to significant power expenditures and overall performance issues when executed by computing devices. For example, when applications utilizing certain functions that are not properly configured for use on system-on-chip (SoC) architectures are executed on a SoC device, application performance may be sluggish and/or the battery of the device may be quickly depleted. FIGS. 1A-1B graphs (e.g., Pareto optimality graphs) illustrating general relationships between power consumption and accuracy and run-time speed configurations for applications and/or complex algorithms. In particular, the graphs illustrate that as typical applications and/or algorithms are configured for greater accuracy (or precision) or run-time speeds, their power consumption increases as well.

Users may tolerate different experiences with applications regarding execution speed, precision, and/or accuracy of application results. However, the users' tolerance thresholds may not be knowable in advance, as such requirements are often user-dependent and individual. For example, some users may be tolerant of delays with certain application results, whereas other users may be entirely intolerant of even slight delays in receiving the same application results (e.g., face tagging). As another example, when an application is executed on a laptop, face detection complex algorithms may be allowed to be slower; however, when executed on smart glasses, slight delays in face detection algorithms may be unacceptable to users. Thus, user experience requirements for application performance may be difficult and impractical for programmers to address with pre-provided hints, such as pragma or directives that otherwise may be used to improve the execution of complex algorithms. For example, programmers or developers may misjudge the portions of code that should be configured via hints (e.g., pragma) to be less precise in order to improve response times, causing annoyance from users.

Simplistically executing all applications and/or complex algorithms used by the applications with their most resource-intensive configurations may be inefficient or infeasible, depending on the circumstances and the user. For example, too much power may be utilized too fast for no appreciable gain to users when applications' algorithms are configured to use their highest execution speed configurations. As another example, power may be wasted when applications use maximum resources but do not require the highest floating point precision for some of their components and can tolerate lower precisions from complex algorithms (e.g., stages of machine learning algorithms may be run with lower precision while the results still acceptable). Thus, intelligent techniques are needed that learn improved ways of configuring applications and/or the complex algorithms used by the applications to balance performance of the computing device with user experience.

The various aspects provide methods, devices, systems, and non-transitory process-readable storage media for using the invocation and use of an application that utilizes complex algorithms to learn user-acceptable ways to adjust the execution of the application and/or the complex algorithms. In other words, aspect techniques automatically learn a user's requirements or preferences for the application's performance in order to provide a sufficient user experience, such as when performing complex algorithm executions. Such learning may be accomplished based on observed inputs from the user or other contextual information during the execution or at the completion of the application and/or its complex algorithms. Based on the received feedback from users, the computing device may continually adjust configurations to the execution of the application and/or complex algorithms of the application, such as by increasing/decreasing accuracy or precision, increasing/decreasing execution speeds, and/or changing the cores that are assigned to execute complex algorithm operations.

In various aspects, the computing device may listen for and process various signals provided by the user to infer whether the execution and current configuration of the application and/or complex algorithms are providing an acceptable user experience. In particular, the computing device may analyze user interactions with the interface and/or sensors of the computing device to identify whether the application is providing sufficient real-time responses, accuracy, and/or precision in results such that the user is not providing feedback/inputs that are consistent with frustration or dissatisfaction with the results. For example, the computing device may identify taps on a touch screen that indicate satisfaction with result data generated by complex algorithms of the application. In various aspects, signals indicating the user's experience in relation to the execution of the application and related complex algorithms may be obtained and/or processed by both the operating system of the computing device and/or the application. In some aspects, the computing device may utilize behavioral analysis systems, such as behavioral systems for anomaly detection (e.g., detecting malware applications), to determine whether application responses are within tolerable parameters for a user.

Regarding response time (or execution speed) configurations of the application and/or complex algorithms used by the application, the computing device may observe whether the user shifts the focus of the interface to another application, continually provides inputs while an execution is occurring (e.g., refreshing, tapping on the touch screen, etc.), and/or does not provide inputs in a timely manner after the execution has completed and results are presented to the user. For example, if a result requested by the application is delayed and the user navigates away from the application (e.g., closes the application, switches to another application, etc.), the computing device may infer that the user is intolerant of the delay and that the execution deadline (or delay) for providing the results has been too long. As another example, if the computing device determines that based on signals, the user continually refreshes the application and/or repeatedly presses some of the buttons while the results of the application are being calculated in the background, the computing device may infer that timeliness preferences of the user for the application are being missed.

Regarding accuracy and/or precision of the application and/or the complex algorithms used by the application, the computing device may monitor for user inputs or signals that indicate the user finds the results from the application to be inadequate. For example, when the user ignores the output of a complex algorithm of social media application (e.g., face detection and tagging) that was computed with lower precision than the maximum available as determined based on the lack of user inputs, the computing device may infer that the precision was too low (e.g., face tagging wrong people too often, etc.) for the user. As another example, when the user provides inputs that correct output of the complex algorithms of the application (e.g., correcting transcriptions, user corrections to an auto-correct function, etc.), the computing device may interpret such signals to indicate that the precision was too low for the user's preferences, and may increase the precision configuration for the complex algorithms for subsequent executions by the associated application. In some aspects, the extent of observed user corrections to application outputs may be used to adjust application and/or complex algorithm configurations. For example, if a user completely rejects the name tagging results for an entire picture, the computing device may infer that the precision configuration for a tagging algorithm should be increased significantly, while if a user merely corrected a small portion of the name tags for a picture the computing device may infer that the precision configuration for a tagging algorithm need not be adjusted or adjusted to a small extent.

In some aspects, the computing device may be configured to continually and automatically adjust the configurations or execution speed of the application and/or complex algorithms used by the application in order to learn lower bounds for user-acceptable performance based on observed user inputs/signals. For example, the computing device may be configured to learn the user's tolerance threshold for face-tagging algorithms in a social media application by incrementally lowering either the execution speed and/or the precision of the algorithms until inputs are detected that indicate annoyance of the user (e.g., repeatedly button pressing, user ignoring the tags, etc.). In this manner the computing device may discover a set of application configurations and execution speeds that are efficient while satisfying the user's preferences without requiring the user to set the preferences manually.

The application may utilize various complex algorithms that each contribute to the user experience, and in some aspects each of the complex algorithms may be associated with its own configurations or settings (e.g., accuracy, precision, execution speed, etc.) that may be individually adjusted to improve the user experience in response to obtained user inputs indicating poor experiences. However, as user inputs may not indicate the complex algorithms' configurations that are necessarily contributing to poor experiences, the computing device may be configured to adjust complex algorithms individually in an iterative fashion. For example, after detecting a first user signal indicating poor user experiences with the application (e.g., due to delays in results or inaccurate results), the computing device may improve a first configuration of a first complex algorithm of the application and observe subsequent user interactions, such as subsequent responses via touch inputs, etc. If the computing device then observes a subsequent second user interaction indicating or consistent with a poor user experience, the computing device may adjust a second configuration of a second complex algorithm used by the application and again observe subsequent user interactions. Such an "adjust and observe" process may be repeated until the computing device observes user interactions consistent with a satisfactory user experience. Selecting different complex algorithms to adjust may be accomplished via a predefined priority list, via hints provided by developers (e.g., pragma), and/or from remote devices (e.g., a cloud server having knowledge of other instantiations of the application and related user experiences).

In some aspects, if the application and/or a complex algorithm cannot be adjusted sufficiently to satisfy the requirements of the user, the work may be offloaded to a cloud-computing device at a next invocation of the application and/or complex algorithm. For example, when observed user interactions indicate that the user continues to be annoyed by processing delays when a face detection algorithm is performed (e.g., based on numerous taps being detected on a mobile device, the mobile device may offload the next face detection operations to a remote server while the mobile device uses its full resources for other operations.

In various aspects, multiple processing cores with different specifications may be available in the computing device (e.g., a mobile device) configured to utilize aspect techniques. Depending on how fast and accurate the results of specific computations are required to be, the application (or portions of the application) and/or complex algorithms may be scheduled, dispatched, and run on various processing cores of the computing device to save energy while providing timely results. The system architecture described herein may be used to achieve this goal by collecting hardware and application requirements and status to be used for scheduling, adjusting, and executing application and/or the complex algorithms associated with the application. In some aspects, the computing device may utilize various information to identify how to configure the application and/or complex algorithms (e.g., computational kernels invoked by apps) for efficient execution on one or more of its various cores. For example, the computing device may utilize steady state characteristics and capabilities of the hardware of the computing device (e.g., heterogeneous cores, memory, etc.), previously identified parameters for executing the application and/or complex algorithms (e.g., acceptable execution speed or deadline, accuracy, etc.), any current or transient states or conditions of the various hardware of the computing device, and/or historical resource usage by the application and/or complex algorithms used by the application (e.g., cache misses, memory access pattern, bandwidth utilization, exception and branch frequency, etc.). Such information may be obtained via queries of system variables (e.g., special registers), pragma indicators within code associated with the application, API calls within the application and/or related software, and/or from user inputs (e.g., detected touches indicating impatience, selection inputs indicating incorrect or unacceptably delayed response times, etc.). In some aspects, the computing device may utilize a scheduler or load distributer module to use the information (such as missed deadlines and load balancing history) to configure (or assign) software to be executed on various cores. In some aspects, the computing device may store or otherwise preserve core usage data for use in subsequent executions of the application and/or complex algorithms, such as by providing kernel usage data during the execution of the application to a resource history subsystem.

In some aspects, the computing device may utilize predefined trade-off functionalities and/or other user or developer provided data to determine configurations/settings of the application and/or the complex algorithms used by the application that may be adjusted to best improve the user experience. For example, based on pragma indicating that a vector math algorithm used by a video game application may utilize a soft deadline for providing results, the computing device may adjust the vector math algorithm accordingly in response to inferring that the user is annoyed with the computing device's current performance based on continuous taps on the touch screen. As described herein, the computing device may make adjustments to the application and/or complex algorithms based on user-provided hints (e.g., although a programmer may identify a portion of the code as being computationally intensive, a compiler may or may not adjust the execution of that code). However, at a later time, portions of that code (e.g., via API calls and/or pragma) that have been highlighted as a result of observed user interactions may be evaluated by the computing device to identify potential delays that may cause poor user experiences.

Some aspects may utilize architectures designed for dynamic execution of the application and/or the complex algorithms used by the application executing on the computing device by using trade-off functionalities that address dynamic limitations (e.g., available power, computation capabilities, etc.) of the computing device. In particular, some aspect techniques may provide functionalities for trading-off performance and accuracy with energy and power consumption.

In order to execute the application and/or complex algorithms used by the application on devices, various evaluations may be required to determine whether the device will be negatively affected by executing the application and/or the complex algorithms and/or whether the computing device should take other precautions. For example, mobile devices may perform tests to ensure complex algorithm executions do not deplete the battery when there is only a limited available power level. As another example, precautions to avoid over-optimizations leading to sluggish or non-real-time output for certain critical applications may be required for computing devices. Another example is precautions and evaluations to avoid overheating the processor while trying to meet real-time deadlines.

Users may set static parameters for adapting the execution of the application and/or complex algorithms used by the application, such as via directives (or "pragma") embedded within code or instruction sets. One such adaptation may be to adjust (e.g., increase or decrease) the speed of computations. Reducing the speed of execution may be useful when algorithm output is not needed in real-time by users. For example, as some users may tolerate slight (or soft) real-time delays due to being otherwise occupied (e.g., adding text descriptions to photos), the output for a face-tagging algorithm may be slightly delayed when a new picture is obtained. As another example, users may tolerate waiting until the computing device is plugged into a power source overnight to perform clustering of pictures taken during the day and grouping them into distinct albums. As another example, machine learning algorithms may be allowed to process feedback data overnight (and when the device is plugged into a wall outlet) in order to tune the algorithms' configurations for the next day's use. Reductions in execution speed may sometimes not be feasible, such as when algorithms have hard real-time requirements when providing speech recognition and/or transcriptions.

Another such adaptation may be to adjust (e.g., increase or decrease) the precision and/or accuracy of calculations. For example, when available power is limited, a user may tolerate slight accuracy or precision drops with a face-detection or face-tagging algorithm as long as a certain percentage of the results are correct. Some applications and/or algorithms may not need high precision to provide adequate results.

Another such adaptation may be to schedule operations for execution on different cores. Such scheduling may be dependent upon input data and the state of the system (e.g., static device information such as hardware capabilities and other transient information such as battery power) at a given time (e.g., an initial time). For example, when a device battery has a large amount of available battery power, a computing device may configure the application to utilize all cores to meet a processing deadline with a scientific library function, but in other cases (e.g., when battery is below a predefined level), the computing device may compromise and only use a single core or a special core to execute the function.

In some aspects, the computing device may be configured to tune how much memory bandwidth (or channel) is utilized by an application to occupy in order to transfer data or code that is required for calculations. Such tuning may be done so that other processes are allowed to access and otherwise utilize the same channel as used by the application. In some aspects, the computing device may be configured to change a memory hierarchy (e.g., the amount of stack and heap allocated to various cores on a shared memory) to meet certain deadlines for executing an application, with or without needing to wake up other cores that are on standby.

In addition to machine learning techniques based on detected user inputs, some aspects may also utilize intelligent systems for determining how to dynamically set and adjust configurations of the application and/or complex algorithms in order to accommodate device performance expectations of users as well as device constraints at a given time. Thus, some aspects improve the functioning of a computing device by enabling the computing device to automatically adjust performance of the application and/or complex algorithms to accommodate changing circumstances, device states, user performance expectations and other device constraints. Such adjustments may improve power consumption at the device while balancing user experience.

Logical relationships or rule sets (referred to herein as "trade-off functionalities") may be defined, such as by a user of a computing device or an application developer. Each trade-off functionality may indicate various configurations or settings for executing the application and/or a complex algorithm, such as a scientific calculation, that may be invoked by the application. The trade-off functionality may also indicate the conditions or device states of the computing device during the execution of the application that, when detected, may trigger the use of any of the configurations. For example, the trade-off functionality may include data indicating a thermal condition (e.g., device temperature) that when met indicates that the execution of an associated library function should be re-configured to be slowed or made less accurate. As another example, in response to determining that the computing device is connected to a power source (e.g., a wall outlet), data within the trade-off functionality may prompt the computing device to execute a matrix multiplication library function at a higher precision level. In this way, aspect techniques performed by the computing device may enable users to more closely and dynamically control the manner in which the computing device configures time and/or energy intensive applications and/or complex algorithms.

As an illustration, a user may define a trade-off functionality for a particular scientific library function (e.g., a vector math algorithm) executed in association with an application (e.g., a social media application). The trade-off functionality may indicate performance settings (e.g., execution or run-time speed for performing the complex algorithm) relative to thermal or heat energy conditions (or readings) in the computing device. The trade-off functionality may indicate that a slower run-time may be implemented for the scientific library function in an effort to save energy expenditure rate per unit of time due to thermal bottlenecks. Such a connection between performance and thermal conditions may be important to the overall health of the computing device based on predefined thermal limitations (e.g., manufacturer specifications, etc.). The trade-off functionality (or a separate trade-off functionality) may indicate performance settings relative to an available power condition (e.g., available battery level), and may indicate that a slower run-time may be implemented for the scientific library function in an effort to save battery power. The trade-off functionality (or a separate trade-off functionality) may indicate accuracy or precision settings relative to thermal or heat energy conditions, indicating that a lower accuracy or precision setting may be used to lower an energy expenditure rate. The trade-off functionality (or a separate trade-off functionality) may indicate accuracy or precision settings relative to power conditions, indicating that a lower accuracy or precision setting may be used to save battery power.

Trade-off functionalities that define how and under what circumstances the application and/or complex algorithms (or library functions) used by the application may be configured may be activated or otherwise obtained by the computing device in various manners. In particular, the computing device may utilize a trade-off functionality to establish initial configurations for the application and/or functions used by the application at an initial time (e.g., at boot-up, upon loading the application, etc.). Configurations set based on trade-off functionalities may or may not be overridden or otherwise ignored by the computing device in response to receiving user inputs that require re-configurations to be made to the application and/or the complex algorithms. For example, although an application is initially configured to utilize a 'low' precision setting for a particular face tagging algorithm, the computing device may subsequently change the precision setting to 'high' based on user inputs indicating a user is not happy with the face tagging results. Further, the computing device may be configured to ignore trade-off functionalities that are contrary to configurations that should be instituted in the application and/or complex algorithms based on current user satisfaction. For example, the computing device may identify a low-precision setting from a trade-off functionality for a library function as only a suggested configuration that may or may not be employed based on current user inputs indicating user satisfaction.

In some aspects, trade-off functionalities may be defined or activated by directives within code associated with the application and/or complex algorithms to be executed by the computing device. In other words, the application, a library function, or other complex algorithm may be informed of the possibility of settings that may be utilized via a hint indicated in the code, such as a pragma (i.e., a preprocessing directive that causes assembler/interpreter/compiler processes). Such directives may be identified (or otherwise obtained) at compile-time, such as when code including pragma is parsed, interpreted, compiled and otherwise loaded for execution.

In some aspects, trade-off functionalities may be instituted during run-time via application programming interface (API) calls. For example, a thread, proc, or other software-enabled element may be configured to invoke particular API calls for requesting or using defined rule sets for limiting execution of scientific library functions based on thermal energy readings and/or available battery power at a given time (e.g., an initialization or initial time).

In some aspects, the computing device may obtain trade-off functionality data from specially-reserved memory locations (referred to as "special registers") associated with providing application and/or algorithm configurations. For example, a special register may include information indicating that a mathematical algorithm may be configured to use soft/hard real-time deadlines relative to current device temperatures and/or battery power levels.

Regardless of how trade-off functionalities are obtained or activated for use with the application and/or complex algorithms, trade-off functionalities may be utilized in a dynamic manner by continually evaluating various conditions associated with computing device and/or the execution of the application that invokes the complex algorithms. In other words, configurations of the application and/or the complex algorithms may be dynamically set, adjusted, and/or returned to default settings at compile-time of the application and/or dynamically throughout the execution of the application based on current values of polled or measured variables, such as the various operating states of the computing device. For example, once trade-off functionalities for the application that uses a vector math algorithm are established at compile-time based on directives included within the source code of the application, the computing device may continually evaluate battery power of the computing device, workload associated with the executing application, thermal energy of the device (e.g., device temperature), and/or other conditions to determine whether to adjust the configuration of the execution of the vector math algorithm (e.g., run slower/faster, make less/more precise or accurate, run on a different core, etc.). As another example, when a battery is determined to be running low, the computing device may dynamically decide to only execute a machine learning algorithm on two cores that do not include a GPU as the data transfer may require too much energy. In other words, although the trade-off functionalities that map out how configurations are to be changed are established in a more static manner, the triggers or inputs for whether to use the various configurations or settings defined by the established trade-off functionalities are dynamic based on ongoing conditions of the computing device and/or the application.

In some aspects, the computing device may evaluate the workload of an application that utilizes complex algorithms subject to trade-off functionalities to determine whether the application and/or complex algorithms may be re-configured at a given time. For example, the computing device may evaluate a size of an image database to tag, and dynamically request delayed processing for a tagging procedure based on a relevant trade-off functionality for the algorithm. In some aspects, configurations may be adjusted according to trade-off functionalities due to the current available power level of the computing device and the thermal energy level of the computing device. In some aspects, configurations may be adjusted according to trade-off functionalities based on current external conditions. For example, being plugged into an external power source or connected to a wireless router (e.g., Wi-Fi® router) may indicate that more power is available or that less power is being used by the computing device (e.g., transmissions to the router may uses less transmit power), and thus a scientific library function may be configured with a higher execution speed and/or a higher accuracy or precision configuration.

In some aspects, the computing device may adjust configurations of applications (e.g., the execution settings of complex algorithms, scientific function, etc.) based on the trade-off functionalities that are determined to be effective at an initial time as described above. Such adjustments may include changing accuracy, precision, and/or execution speed configurations for performing the application and/or the complex algorithms it uses. In some aspects, the adjustments may include configuring the application to dispatch complex algorithms and/or portions of the application's executable code to one or more cores of the computing device, such as application processor cores, the graphics processing unit (GPU), a digital signal processor (DSP), or any combination of virtual or actual cores. For example, aspect techniques may cause applications that use trade-off functionalities to provide results with lower accuracy (e.g., wrong face tagging or clustering of photos, etc.) and/or utilizing different cores when power resources are limited (e.g., due to energy constraints of a trade-off, etc.) and/or when the computing device is running hot (e.g., due to thermal constraints of a trade-off, etc.).

In some aspects, subprograms or other executable operations may be configured to inherit trade-off functionalities that define accuracy or precision configurations and real-time requirements from their respective parent application. For example, if a parent app utilizes a trade-off functionality that allows a low latency in execution time, a certain deadline (e.g., hard deadline, soft deadline, etc.), and/or a high accuracy result for a scientific function, a sub-application related to the parent app may inherit those same or similar requirements.

The various aspects may provide beneficial techniques for improving the use of computationally-intensive applications, such as applications that employ complex algorithms or scientific computation libraries. For example, configurations that make trade-offs by slowing down computations and/or lowering the accuracy of calculations may enable computing devices to continue operating an application according to a user's current satisfaction and/or various operating conditions (e.g., lower battery, hot device temperature, etc.). In this way, user reactions to the execution of complex algorithms/applications may be used to continually configure subsequent executions in order to balance the performance of the device (e.g., power used, time to complete tasks, components used, accuracy of results, precision of results, etc.) with acceptable user experiences.

Conventional techniques may exist that adjust operating system or hardware settings, such as frequency, voltage, clock speed, power draw, and resource allocations (e.g., radio activation/use, etc.) with respect to the execution of programs on a computing device. However, these conventional techniques are different from the aspect techniques disclosed herein that configure applications and/or software utilized by the applications (e.g., library functions, etc.). In other words, the aspect techniques adjust application settings, not hardware or system settings, in order to arrive at user-acceptable experiences with the applications regarding accuracy/precision, execution speed, etc. For example, aspect techniques may change how an application uses scientific functions (e.g., precision at double, double-double, etc.) based on an interpreted user satisfaction with previous invocations of the scientific functions. As another example, the aspect techniques may be used to change how the application assigns the execution of different parts of scientific functions, such as by assigning parts of a loop or other portions of executable code to one or more processors or setting the loop or other portion to execute in a serial or parallel fashion. As another example, using the aspect techniques, a computing device may adjust an application to be configured to use hyper-threading of operations of a library function on a single core to promote faster pre-fetching of data.

Further, the aspect techniques differ from conventional techniques in that the aspect techniques do not utilize or adjust user preferences and/or user profiles, but instead adjust application-specific and/or algorithm-specific configurations. For example, an application may be configured to utilize lower-precision calculations with a scientific function (e.g., matrix multiplication, etc.) based on user feedback data indicating the previous results from the scientific function were too imprecise (e.g., user inputs indicating a number of wrong or imprecise calculations by the application, etc.). Additionally, unlike some conventional techniques tasked with identifying optimal solutions to general problems, the aspect techniques simply utilize user feedback to change software executions to better suit the current expectations of the user. For example, the aspect techniques do not work to solve logical dilemmas with expert programs or solution engines, but instead re-configure applications so that their execution better comports with a user's current satisfaction feedback (e.g., taps on the screen, staring at screen, etc.).

The aspect techniques may use current user satisfaction feedback data (e.g., user inputs to the application) to identify changes that should be made to application configurations in the future to improve the user's satisfaction with the execution of the application. For example, based on a measured number of wrong answers within a batch of images that have been tagged with names (e.g., via face-tagging function call), the computing device may adjust one or more face-tagging accuracy settings for an application so that subsequent executions of the face-tagging function may utilize a higher precision (but slower) configuration. In this way, the computing device does may identify how to re-configure executions based on a history user activity and satisfaction with the execution of applications.

The following descriptions refer to trade-off settings, configurations, and other adjustments that may be made to library functions and/or complex algorithms associated with and executed by applications based on user satisfaction and according to various aspects. For example, the following descriptions refer to trade-off settings that are obtained by a computing device for a particular library function utilized by an application. However, it should be appreciated that the various aspect techniques may change the configurations of applications or portions of the applications (i.e., software or code segments executing on a computing device) regardless of their use of complex algorithms or library functions. Thus, references to configurations or settings for a particular library function, algorithm, scientific calculation, code, and/or other particular functionality are merely illustrative and not limiting in terms of the aspect techniques that adjust software configurations. For example, configurations related to execution speed and/or accuracy may be made to any combination of an entire application (e.g., a program), a portion of the application (e.g., a loop within the code of the application, etc.), and a library function called by the application (e.g., a matrix multiplication operations, etc.).

Figure 2:
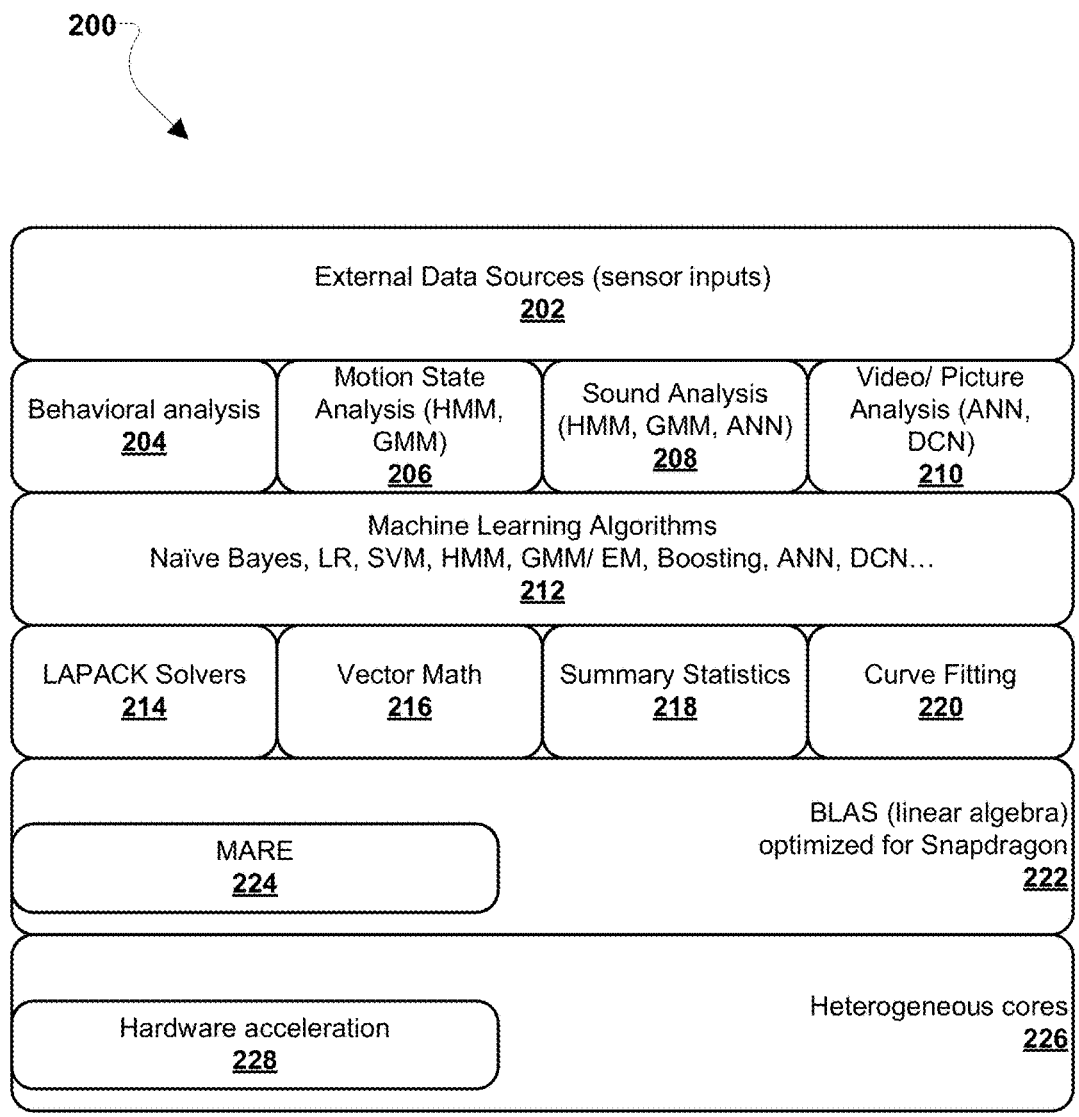
FIG. 2 is a component block diagram of an architecture implemented in a multicore device and suitable for use with various aspects.

FIG. 2 illustrates an architecture 200 implemented in a multicore computing device and suitable for use with various aspects. The architecture 200 may include modules for providing various functionalities of the computing device, including external data sources 202 (e.g., sensor inputs) capable of providing data indicating connections and/or operating conditions of the device (e.g., plugged into a power outlet, being moved, etc.) The computing device may also include various modules that may be executed in combination with various software, routines, applications, and/or instruction sets, such as a behavioral analysis module 204, a motion state analysis (e.g., Gaussian Mixture Model (GMM), Hidden Markov Model (HMM), etc.), a sound analysis module 208 (e.g., GMM, HMM, artificial neural networks (ANN), a video and/or picture analysis module 210 (e.g., deep convolutional network (DCN), ANN, etc.), machine learning algorithms 212 (e.g., Naïve Bayes, logistic regression (LR), support vector machine (SVM), HMM, GMM/Expectation Maximization (EM), Boosting, ANN, DCN, etc.), and various complex algorithms, such as Linear Algebra Package (LAPACK) Solvers 214, a vector math algorithm 216, summary statistics algorithms 218, and curve fitting algorithms 220. The architecture 200 may also include modules optimized for a particular computing environment, such as a linear algebra library 222 (e.g., Basic Linear Algebra Subprograms (BLAS), etc.) that is optimized for a Snapdragon® processor. Such a library 222 may also include a MARE module 224 (e.g., a module for optimizing power and efficiency by utilizing multicore architecture). The various components 204-224 may utilize complex algorithms that may benefit from the aspect trade-off functionalities as described herein. In various aspects, the architecture 200 may include various other modules that may also benefit from aspect trade-off functionalities and other configuration techniques as described herein, such as complex algorithms that relate to biological analysis, video game or other graphics engine operations, etc.

The architecture 200 may also include various cores, such as heterogeneous cores 226 having different capabilities, specifications, and/or characteristics. A hardware acceleration module 228 may also be included. In some aspects, various cores 226 may be utilized to perform operations related to the above-described modules 204-224 as set within related trade-off functionalities and/or otherwise configured based on user feedback.

Figure 3:
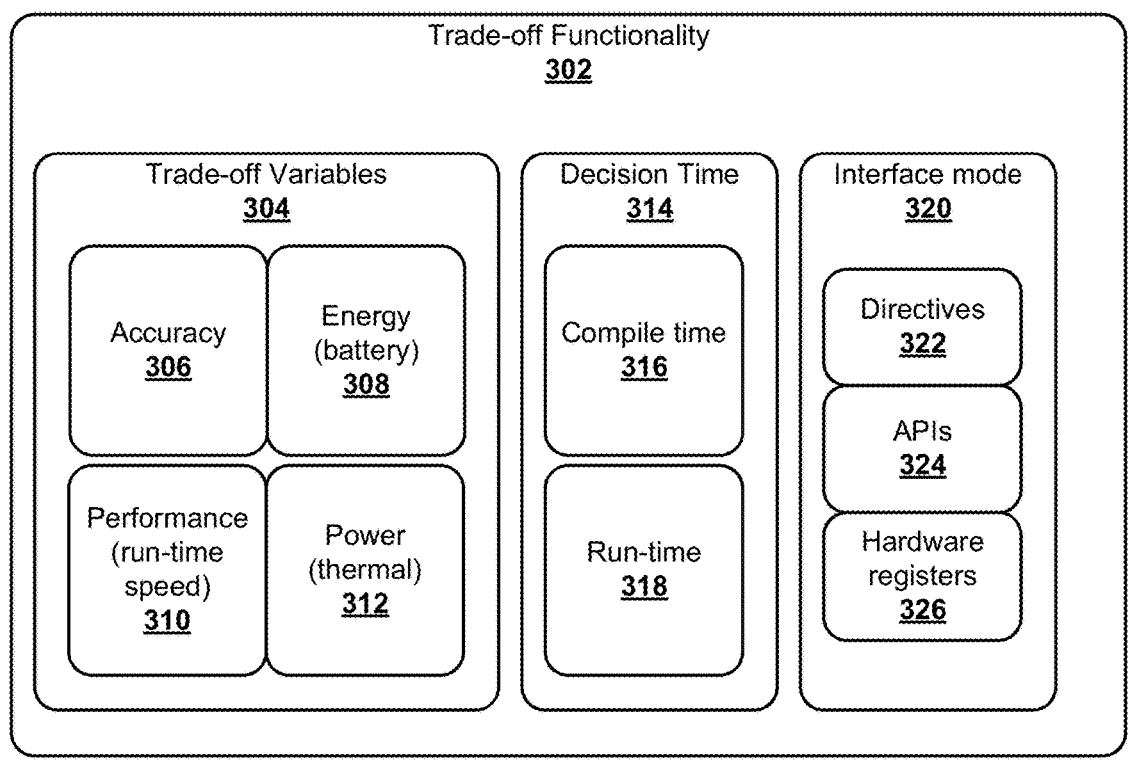
FIG. 3 is a component block diagram of a trade-off functionality associated with an application according to various aspects.

FIG. 3 illustrates an exemplary trade-off functionality construct 302 according to various aspects. The trade-off functionality construct 302 may be a data structure, logic, instructions, or other stored information that may define different configurations or settings for an application or a complex algorithm (e.g., a particular library function, a scientific computation, etc.). In various aspects, the trade-off functionality construct 302 may be predefined and activated via user/developer inputs (e.g., API calls, pragma, etc.), or alternatively may be generated based on such inputs.

The trade-off functionality construct 302 may include, store, utilize, and/or otherwise be associated with trade-off variables 304, such as variable(s) for accuracy 306 (e.g., a current accuracy setting, a high accuracy setting, a lower accuracy setting, etc.), a variable for energy 308 (i.e., a ceiling battery energy value, a floor battery energy value, etc.), variable(s) for performance 310 (e.g., a current execution or run-time speed, a lower execution speed setting, a high execution speed setting, etc.), and variable(s) for power 312 (i.e., a ceiling thermal power value, a floor thermal power value, etc.). The trade-off functionality construct 302 may include, store, utilize, and/or otherwise be associated with decision time module data 314 that includes compile time data 316 (i.e., static data) and/or run-time data 318 (i.e., potentially dynamic data) that may indicate how the trade-off functionality construct 302 may be instituted, activated, and/or otherwise adjusted. The trade-off functionality construct 302 may include, store, utilize, and/or otherwise be associated with an interface mode data 320 that may indicate manners in which the trade-off functionality construct 302 may be adjusted and/or activated, such as directives data 322, API data 324, and hardware registers 326.

FIG. 4 illustrates a set 400 of exemplary directives (or "pragma") suitable for use with various aspects. Such directives may be utilized by a computing device at compile-time, such as when source code is utilized during compiling to generate an executable for use on the computing device. In general, conventional pragma or other similar directives may be code, text, and/or other information that a developer inserts within other code in order to provide a hint or directions for compilers or other processing systems of the computing device. Conventional pragma may directly control the compile-time operations and results. For example, when an exemplary conventional pragma indicates a certain section of an executable is to be adjusted, the computing device will adjust the functionality accordingly.

Unlike conventional directives, some aspect techniques may utilize directives that are not unilaterally determinative of the manner the computing device may eventually operate. Instead, directives as used in some aspect techniques may simply suggest a preference for operations or configurations of applications and/or complex algorithms that may be overridden by evaluations of other conditions relevant to the computing device. In other words, directives as used in some aspect techniques may indicate trade-off functionalities applicable to various applications and/or complex algorithms that may or may not be used by the applications executing on the computing device. For example, a pragma as used with aspect techniques may point to a particular trade-off functionality (or rule set) that a user may prefer to be used at a given time for a particular library function, however the computing device may utilize different trade-off settings for the library function based on dynamic system state variables evaluated in real-time. In other words, some aspect techniques may utilize pragma as one possible input to use to tell the system what sort of a trade-off schema the system should use for some applications and/or complex algorithms.

The following is a description of the exemplary set 400 of pragma illustrated in FIG. 4 that may be used to configure a complex algorithm used by an application executing on a computing device. Each exemplary pragma 402-410 in the set 400 may include a keyword (e.g., "#pragma") indicating it is a suggested or preferred directive, an argument indicating the target complex algorithm (or library function) that is addressed by the pragma (e.g., "scientific_library"), a characteristic of the target complex algorithm (e.g., "deadline"), and a keyword indicating the preference for configuration for the characteristic (e.g., "HardReal-time", etc.). The exemplary set 400 of pragma may include a first pragma 402 for indicating a compile-time preference for a scientific library algorithm to be executed such that it has a hard real-time deadline, a second pragma 404 for indicating a compile-time preference for a scientific library algorithm to be executed such that it has a soft real-time deadline, a third pragma 406 for indicating a compile-time preference for a scientific library algorithm to be executed such that it may opportunistically save battery power when appropriate, a fourth pragma 408 for indicating a compile-time preference for a scientific library algorithm to be executed with a deadline of 15 seconds, and a fifth pragma 410 for indicating a compile-time preference for a scientific library algorithm to be executed with a deadline of 10 minutes.

Figure 5:
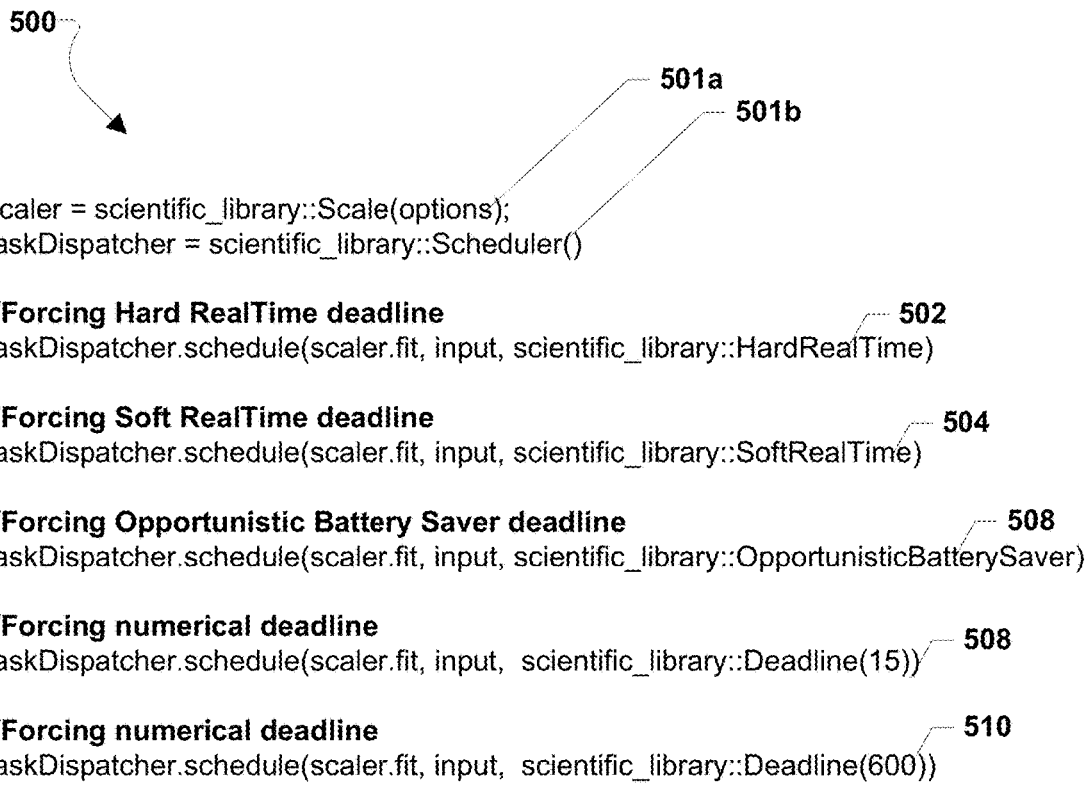
FIG. 5 is a diagram illustrating a set of exemplary application programming interface (API) calls suitable for use with various aspects.

FIG. 5 illustrates a set 500 of exemplary application programming interface (API) calls suitable for use with various aspects. Unlike the exemplary pragma described above with reference to FIG. 4, such API calls may enable real-time invocations of various trade-off functionalities for applications and/or complex algorithms executing on a computing device. As an illustration, a scalar functionality associated with a scientific library may be initiated with the first line 501a and a task dispatcher routine may be associated with a scheduler for a scientific library in line 501b. Each API call 502-510 in the set 500 may illustrate different invocations via the task dispatcher to cause different trade-offs to be requested in real-time. The exemplary set 500 may include a first API call 502 for forcing a hard real-time deadline related to the scalar functionality, a second API call 504 for forcing a soft real-time deadline related to the scalar functionality, a third API call 506 for forcing a soft opportunistic battery saver deadline related to the scalar functionality, a fourth API call 508 for forcing a first numerical deadline (e.g., 15 seconds) related to the scalar functionality, and a fifth API call 510 for forcing a second numerical deadline (e.g., 600 seconds) related to the scalar functionality.

In the examples described above with reference to FIGS. 4-5, the computing device is configured to utilize trade-offs related to deadlines (or execution speed) for complex algorithms utilized by applications executing on the computing device. However, in other possible implementations of the aspect techniques, trade-off functionalities may address accuracy and/or precision configurations of complex algorithms executed by applications. For example, similar to deadlines, accuracy expectations may be provided as directives, through the APIs, or by setting hardware registers. For example, a pragma may be used to indicate a library function (e.g., a complex algorithm for multiplying matrices, vector multiplication, etc.) is preferred to be performed with a high accuracy, a rough accuracy, and/or an especially high accuracy with respect to an application (e.g., double accuracy, double-double accuracy, etc.).

Figure 6A:
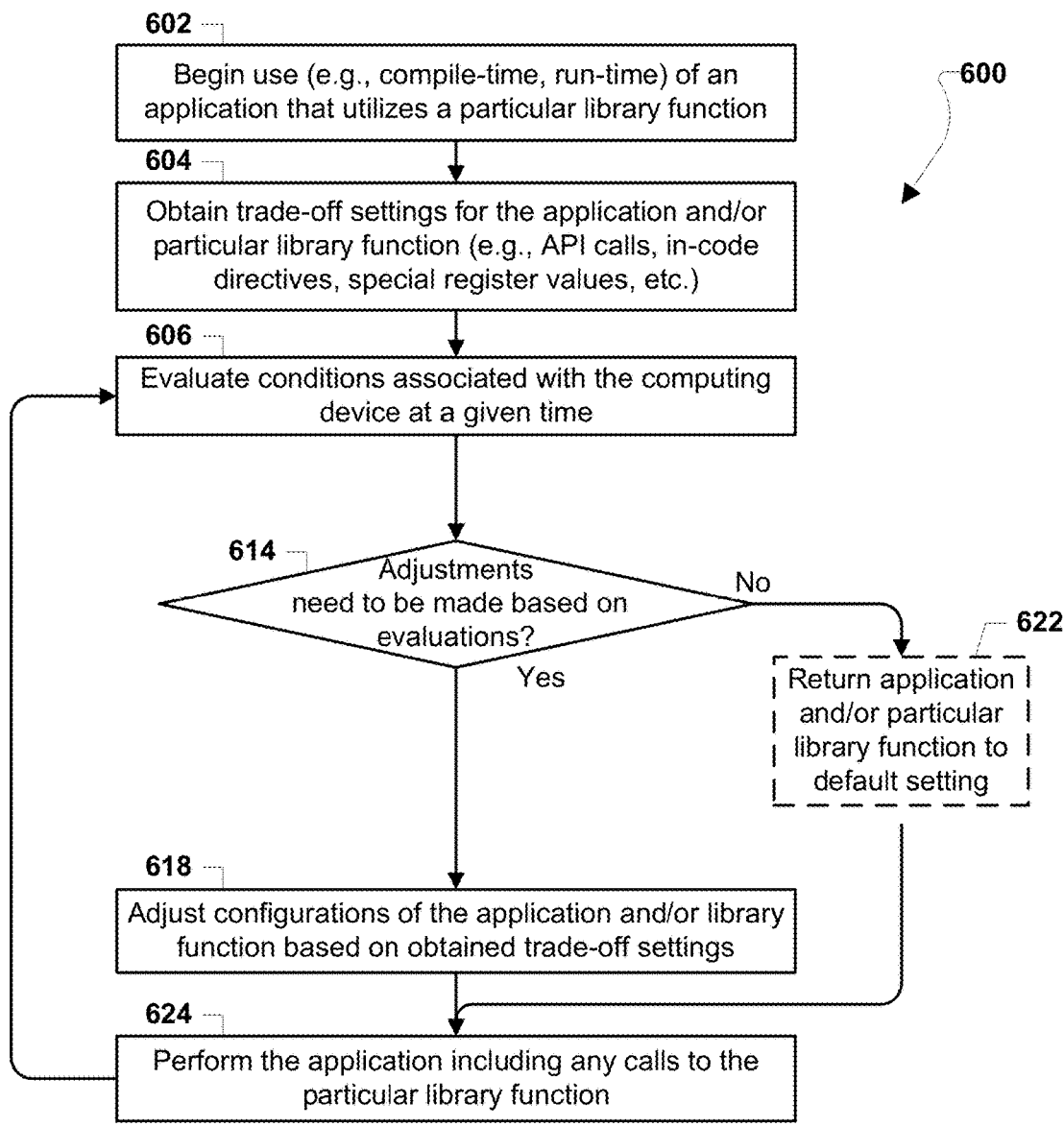
FIGS. 6A-6B are process flow diagrams illustrating aspect methods for a computing device to adjust configurations of an application and/or complex algorithms used by the application as defined in trade-off functionalities and based on evaluated current conditions.

FIG. 6A illustrates an aspect method 600 for a computing device to adjust configurations of applications and/or complex algorithms utilized by the applications executing on the computing device as defined in trade-off functionalities and based on evaluated current conditions. In various aspects, the method 600 may be performed by the computing device to make adjustments to one or more complex algorithms (referred to below simply as library functions) based on associated trade-off functionalities. Such adjustments (i.e., "trade-offs") may be made continually during the execution of the applications which call the one or more complex algorithms. For example, trade-offs may be made before the execution of each call to a vector math library function.

In block 602, a processor of the computing device may begin executing (e.g., compile-time, run-time) an application that utilizes a particular library function. For example, and as described above, the application may be a social media application, a video game application, or other software that may make internal calls to libraries that require significant computing resources (e.g., linear algebra library functions, matrix math algorithms, etc.). In block 604, the processor of the computing device may obtain trade-off settings for the application and/or the particular library function (e.g., API calls, in-code directives, special register values, etc.). In other words, the computing device may obtain a trade-off functionality (or a plurality of trade-off functionalities or plurality of trade-off settings) for the application and/or the library function that indicates various variables, values, and data for adjusting the configuration of the application and/or the library function by the computing device (e.g., execution speed in relation to power level, execution speed in relation to thermal energy, accuracy in relation to power level, accuracy in relation to thermal energy, etc.). For example, the computing device may obtain a first trade-off setting for the application via an application programming interface (API) call during run-time of the application, a second trade-off setting for the application via an in-code directive, and/or a third trade-off setting for the application via a special register. In various aspects, the library function may be associated with a machine learning algorithm, a complex mathematical algorithm, an audio analysis algorithm, a graphics manipulation algorithm, and an imagery analysis algorithm.

In block 606, the processor of the computing device may evaluate various conditions associated with the computing device at a given time. Additional details about the operations in block 606 are described below. In some aspects, the given time may be an initial time designated for establishing initial configurations of the application and/or the library function, such as the first time the application or library function is executed.

In determination block 614, the processor of the computing device may determine whether adjustments to the configurations of the application and/or the library function (or "trade-offs") need to be made based on the various evaluations. For example, the computing device may determine whether a trade-off setting of a plurality of obtained trade-off settings is to be utilized to adjust an initial configuration of the application and/or the library function based on the evaluated conditions associated with the computing device at the initial time. In response to determining that no trade-offs need to be made based on the various evaluations (i.e., determination block 614="No"), the processor of the computing device may return the application and/or particular library function to a default setting in optional block 622. The operations in optional block 622 may be optional as the application and/or library function may already be configured to operate with its default settings. In response to determining that trade-offs need to be made based on the various evaluations (i.e., determination block 614="Yes"), the processor of the computing device may adjust configuration(s) of the application and/or the library function based on the obtained trade-off settings in block 618. Additional details about the operations in block 618 are described below.

In response to performing any of the operations of the blocks 618 or 622, the processor of the computing device may perform the application including any calls to the particular library function in block 624. The computing device may continue with the evaluation operations in block 606.

Figure 6B:
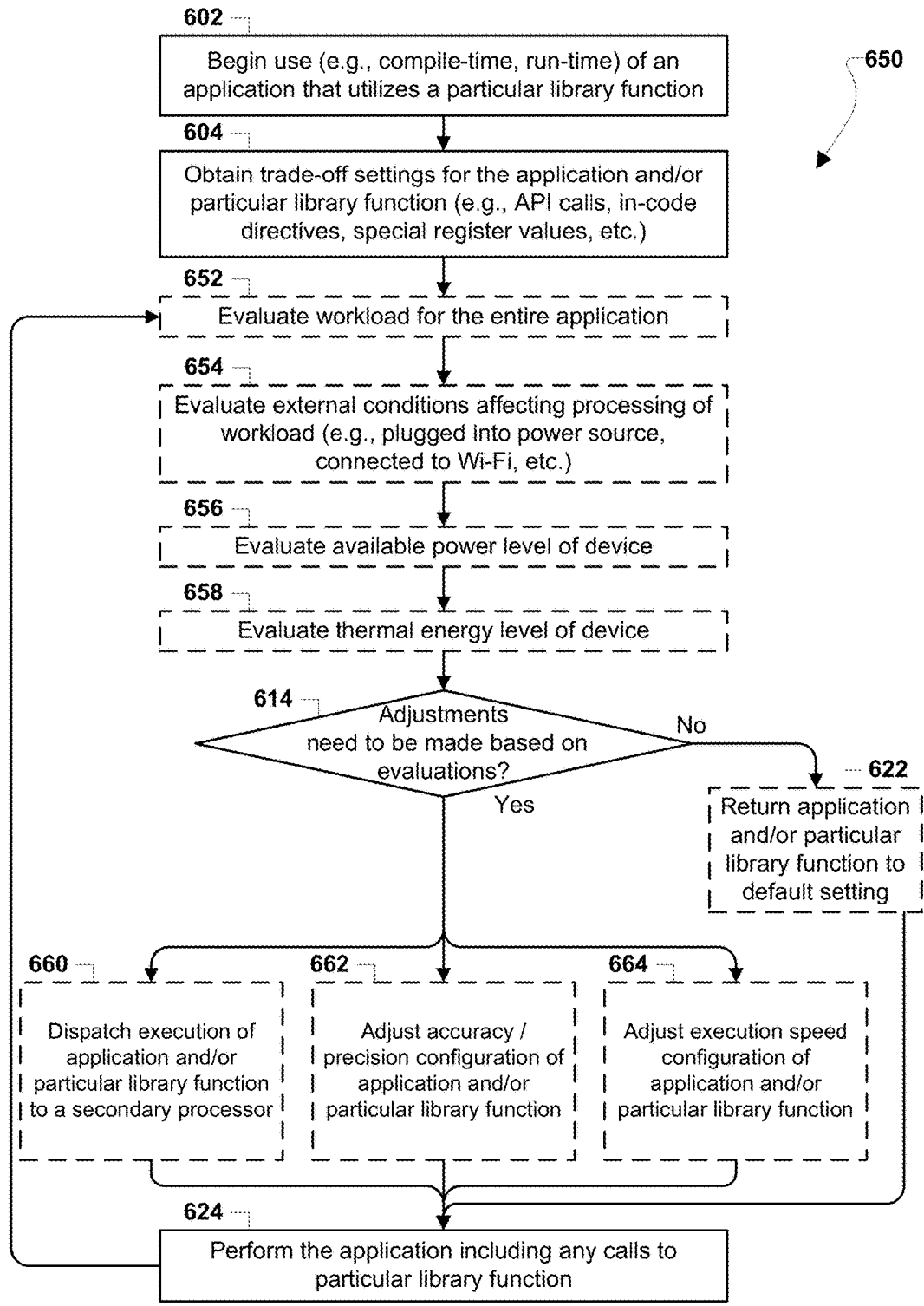

FIG. 6B illustrates an aspect method 650 for a computing device to utilize trade-off functionalities based on evaluated current conditions. The method 650 is similar to the method 600 described above with reference to FIG. 6A, except that the method 650 includes detailed operations for the manners in which the computing device may evaluate various conditions and adjust configurations for applications and/or associated complex algorithms (or library functions) based on the various evaluations.

The operations of blocks 602-604 may be similar to the operations of like numbered blocks described above with reference to FIG. 6A. In optional block 652, the processor of the computing device may evaluate a workload for the entire application, for example by determining the number of calls to the particular library function and/or other functions that may be made within a certain time period, queued jobs, etc. In some aspects, such an evaluation may occur at an initial time, such as when the application and/or library function is first used by the computing device.

In optional block 654, the processor of the computing device may evaluate external conditions affecting processing of workload, such as whether the computing device is plugged into a power source and/or connected to a wireless router (e.g., a Wi-Fi® router). In optional block 656, the processor of the computing device may evaluate the available power level of the device, such as by polling the current battery level of a rechargeable battery coupled to the processor.

In optional block 658, the processor of the computing device may evaluate a thermal energy level of the device, such as by polling a thermistor or other temperature sensor coupled to the processor to identify a current device temperature and/or specific device unit temperatures (e.g., core temperatures, etc.). In determination block 614, as described above for like numbered block with reference to FIG. 6A, the processor of the computing device may determine whether trade-offs need to be made based on the various evaluations.

In response to determining that trade-offs need to be made based on the various evaluations (i.e., determination block 614="Yes"), the processor of the computing device may perform any or all of the operations of the optional blocks 660-664. In particular, the processor of the computing device may dispatch (i.e., reassign or transfer) the execution of the application and/or the particular library function to a secondary processor in optional block 660. Also or alternatively the processor of the computing device may adjust the accuracy configuration and/or a precision configuration of the application and/or the particular library function based on the obtained trade-off settings in optional block 662. In optional block 664, the processor of the computing device may adjust an execution speed (or run-time) of the application and/or the particular library function based on the obtained trade-off settings. In response to performing any of the operations of the optional blocks 660-664 or optional block 622, the processor of the computing device may perform the application including any calls to the particular library function in block 624, and continue with the evaluation operations in optional block 652.

As described above, the computing device may be configured to efficiently adjust the characteristics or configurations of the application and/or complex algorithms utilized by the application, as well as the target processing cores that may be assigned to execute portions of the application and/or the algorithms (also referred to as computational loads or computational kernels). Such efficient adjustment and distribution of computational loads invoked by applications may require various pieces of information. For example, the computing device may utilize steady-state characteristics and capabilities data of the hardware (e.g., data about the type, number, use of heterogeneous cores and/or memory, etc.), acceptable operating parameters for complex algorithms for various applications (e.g., deadlines/execution speeds, precision levels, accuracy levels, etc.), current (or transient) status of hardware resources (i.e., use or availability of heterogeneous cores, etc), and/or historical data regarding resource usage (e.g., cache misses, memory access pattern, bandwidth utilization, exception and branch frequency, etc.) by applications when executing or requesting execution of complex algorithms (e.g., computational kernels called by apps). In some aspects, resource usage data associated with the execution of the application and/or particular complex algorithms used by the application may be provided to a resource history subsystem. With such information, the application and/or complex algorithms may be adjusted and/or assigned to different heterogeneous core(s), such as by a scheduler and load distributer functionality within the computing device.

Figure 7A:
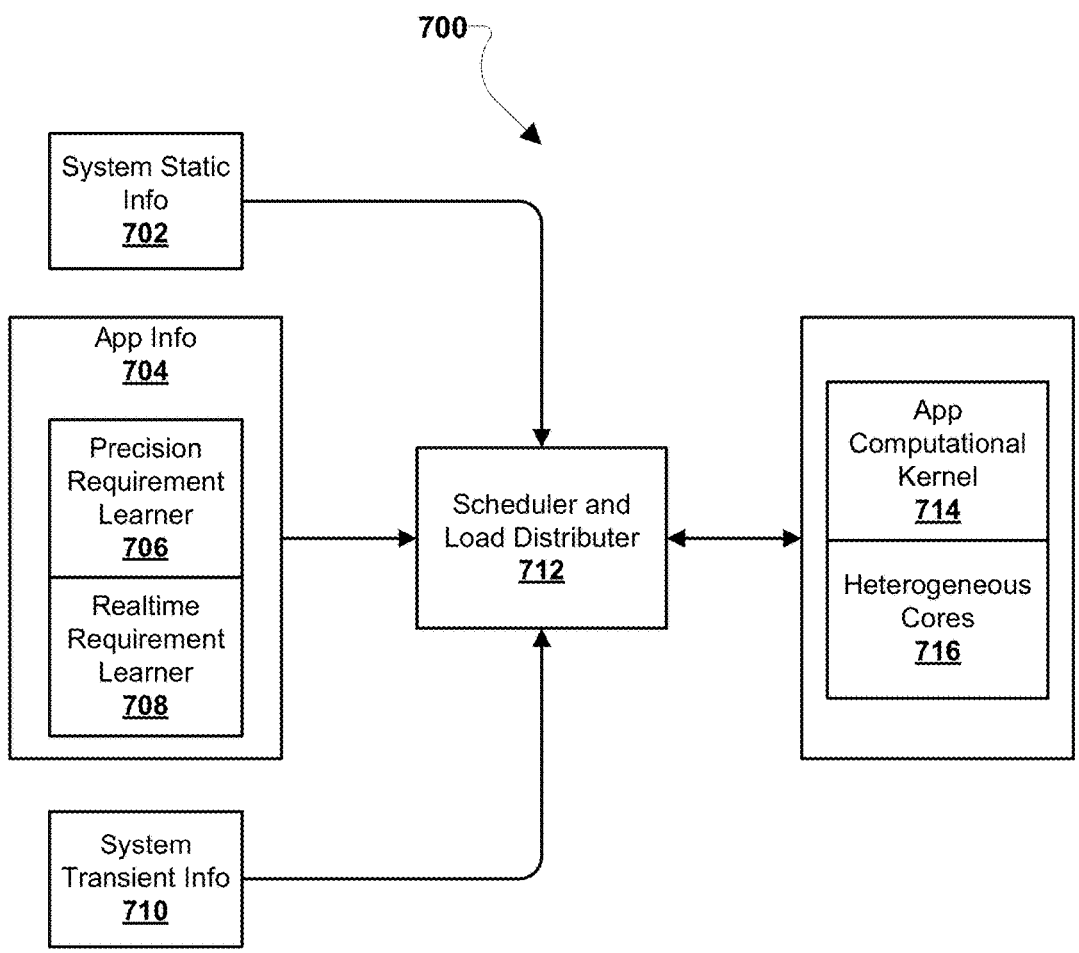
FIG. 7A is a component block diagram illustrating a basic module architecture suitable for use with various aspects.

FIG. 7A illustrates a basic module architecture 700 that may be used by a computing device to implement various aspects techniques, such as functionalities for adjusting, directing, and scheduling the execution of applications and/or complex algorithms utilized by the applications. Such a module architecture 700 may include various modules that provide data (e.g., baselines) for the computing device to decide how, when, and/or where to execute applications and/or complex algorithms (also referred to as "computational kernels") used by the applications. In other words, modules of the module architecture 700 may be used to identify how the computing device may adjust precision, accuracy, execution speed, and/or a target core for executing the applications and/or the complex algorithms used by the applications.

The module architecture 700 may include a system static information module 702 configured to provide information about hardware, such as memory bandwidth, the frequency of different cores, etc., an application information module 704 configured to provide data indicating requirements for specific applications (e.g., how fast results are needed, how accurate results are needed, etc.), and a system transient information module 710 configured to provide data indicating how much of processor (or core) resources are currently being used by other processes supported by the computing device, how much of the memory bandwidth is being used, etc. The module architecture 700 may further include a scheduler and load distributer module 712 that may utilize various information from modules 702-710 to select the processing core to which to assign complex algorithms (or computational kernels) invoked by applications executing in the system. During execution, an application may submit information about a complex algorithm to be executed to the scheduler and load distributer module 712, which in turn may query the modules 702-710 to identify the processing core to which the workload should be sent and/or how the workload should be executed (e.g., adjusted accuracy/precision, etc.).

The module architecture 700 may also include an application computational kernel module 714 that may be the code underlying the libraries and other functionalities of an application. In other words, the application computational kernel module 714 may be instructions of complex algorithms to be submitted to various cores for execution. Further, the computing device may include various heterogeneous cores 716 that may be one or more processing units, such as an application processor, a graphics processing unit (GPU), digital signal processors (DSP), and/or other processing units that may be assigned various workloads via the scheduler and load distributer module 712.

In some aspects, the application information module 704 may include a precision requirement learner module 706 and/or a real-time requirement learner module 708 suitable for implementing machine learning functionalities relative to complex algorithms of applications. The precision requirement learner module 706 may be configured to store, obtain, and otherwise utilize data received at the computing device to learn user preferred, required, or desired precision or accuracy settings for various complex algorithms utilized by applications executing on the computing device. Similarly, the real-time requirement learner module 708 may utilize data to learn required deadlines or execution speeds required (or desired) for complex algorithms. Information received from the user, such as timing of received user inputs, whether user inputs are at all received in response to prompts, and other data indicative of how a user is responding to the execution of applications (and thus their associated various complex algorithms) on the various cores, may be used at the modules 706-708. Further, such data may be overridden, updated, and/or adjusted over time based on continued observed user inputs relative to the execution of applications and/or complex algorithms. For example, over time, data utilized by the precision requirement learner module 706 may coincide with impatient user inputs (e.g., multiple taps on a touch screen while complex algorithms are performed, etc.) that may indicate that a faster execution speed for a face-tagging algorithm is required or desired by the user.

In some aspects, the learning functionalities utilized by the modules 706-708 may also utilize trade-off functionalities or logic as described above. For example, API calls, special registers, and/or in-line directives may be used to control the parameters used by the modules 706-708 when determining how a user is responding to the current executions of various applications and/or complex algorithms.

Figure 7B:
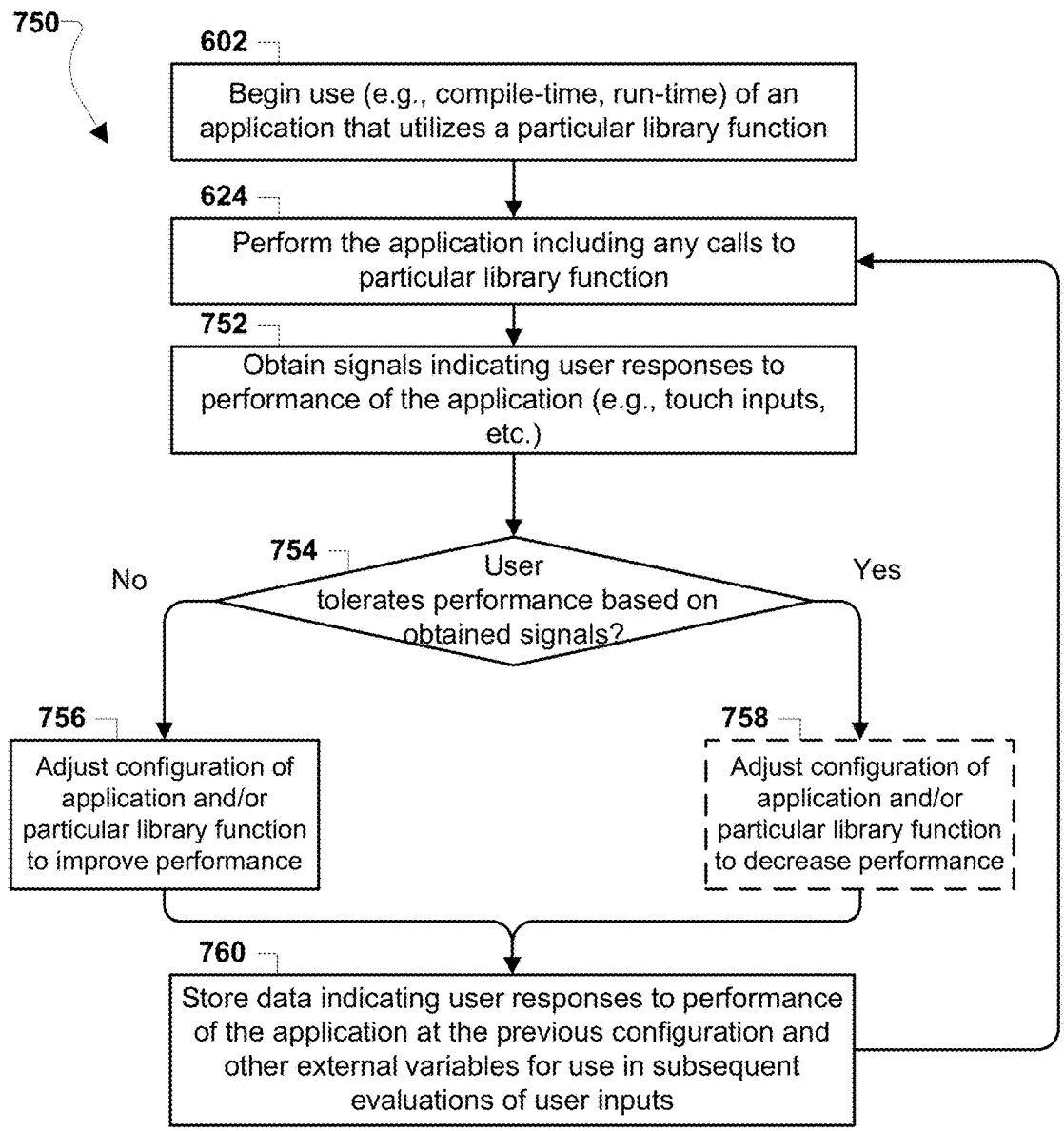
FIG. 7B is a process flow diagram illustrating an aspect method for a computing device to adjust configurations of an application and/or complex algorithms used by the application based on user responses.

FIG. 7B illustrates a general aspect method 750 for a computing device to adjust configurations of an application and/or complex algorithms used by the application based on user responses. The method 750 may be performed by the computing device to make adjustments to the application and/or one or more complex algorithms (referred to below simply as library functions) based on user inputs received over time that imply the adequacy of configurations of the application and/or the library functions. In other words, adjustments may be made based on how well the user is tolerating the performance of an application that is subject to its current configurations (e.g., execution speed, precision, accuracy, etc.) or those of its library functions. As described above, such adjustments may be made continually during the execution of the application. In some aspects, initial configurations of the application and/or the library functions may be based on trade-off functionalities as described above with reference to FIGS. 3-6B; however, based on received user inputs (e.g., repeated touch inputs on a "refresh" button, etc.), the computing device may be configured to overwrite or otherwise change the configurations defined by such initial trade-off functionalities for the application and/or for individual library functions.

The processor of the computing device may perform operations of blocks 602 and 624 as described above for like numbered blocks with reference to FIG. 6A. In block 752, the processor of the computing device may obtain signals indicating user responses to the performance of the application (e.g., touch inputs, etc.). Such obtained signals may include one or more of touch inputs on a touch screen of the computing device, button presses, data from sensors, a state change associated with a launch of another application, a change in a state of the application (e.g., being suspended or put in background because the user has navigated away, etc.), and the absence of user inputs in response to a prompt or circumstance when an input would be expected. For example, the computing device may obtain recent touch inputs on the touch screen of the computing device, text inputs or deletions in text fields or forms, rocker button presses, requests to "refresh" a screen/application, camera inputs, microphone inputs, interactions with the application and/or other applications, etc., that each may be evaluated to identify whether the user is tolerating or otherwise accepts the current performance of the application (e.g., whether the response times are fast enough, whether the results of the application are accurate enough, etc.). In general, the performance of the application may include at least one of an execution speed to achieve results, an accuracy of the results, and a precision of the results associated with the application.

In determination block 754, the processor of the computing device may determine whether the user is tolerating the performance of the application based on the obtained signals. For example, the number of taps on the screen that have been detected since the application began an operation may be evaluated to indicate whether the user is exhibiting signs of impatience, anger, apathy, etc. The frequency of received inputs or the number of detected inputs may be compared to predefined thresholds indicative of user tolerance for a time period. Such thresholds may be updated over time based on continued evaluations of the user's interaction with the computing device. In some aspects, the computing device may evaluate the obtained signals and make determinations of the user's toleration of the performance using specialized logic, software, modules, and/or other functionalities executing on the computing device, such as a subsystem for analyzing user behavior.

In response to determining that the user is not tolerating the performance of the application based on the obtained signals (i.e., determination block 754="No"), the processor of the computing device may adjust a configuration of the application and/or the particular library function used by the application to improve a subsequent performance of the application in block 756. For example, and as described in greater detail below, the computing device may adjust the configuration of the application for using the library function by changing an execution speed setting for the library function as called by the application. As another example, the computing device may adjust a precision setting associated with a vector math algorithm used by the application in order to produce more precise/accurate results, adjust an execution speed setting for a calculation function in order to improve response times for the application (e.g., reduce delay), and/or configure a processing-intensive library call to be performed on a different core (e.g., transfer to a DSP, GPU, etc.). In some aspects, trade-off functionalities as described above may be queries to provide insight to the computing device regarding how or how much adjustments may be made to the application and/or the library function.

In response to determining that the user is tolerating the performance of the application based on the obtained signals (i.e., determination block 754="Yes"), the processor of the computing device may adjust the configuration of the application and/or the particular library function to decrease (or lower the) performance of the application in optional block 758, such as by setting the library function to use a lower precision (e.g., less precise floating point setting for calculations, etc.), a lower execution speed (e.g., greater delay in producing results), and/or changing the processing core on which the library function is performed. In this way the computing device may attempt to reduce the load on the computing device caused by configurations of the application and/or the library functions incrementally until the user indicates the configurations have been lowered below the user's tolerance threshold.

In response to performing the operations of either block 756 or optional block 758, the processor of the computing device may store data indicating the user responses (or obtained signals) to the performance of the application at the previous configuration(s) and other external variables (e.g., time of day, other applications contemporaneously executing on the computing device, sensor inputs, etc.) for use in subsequent evaluations of subsequently obtained user inputs (or signals) in block 760. In some aspects, other example data (e.g., triggers) that may be stored and used may be data that indicates user behavior with the application, a user data feed when the application is a social networking application, the user's health pattern when the application is related to health (or health care), the user's age, gender, and/or other demographic information. In this manner, machine learning techniques may be enabled that continually build upon previous experiences to refine the configurations that may be set for applications and/or various complex algorithms associated with the applications of the computing device. The computing device may repeat the operations the method 750 beginning with performing the application including any calls to the particular library function in block 624.

Figure 8A:
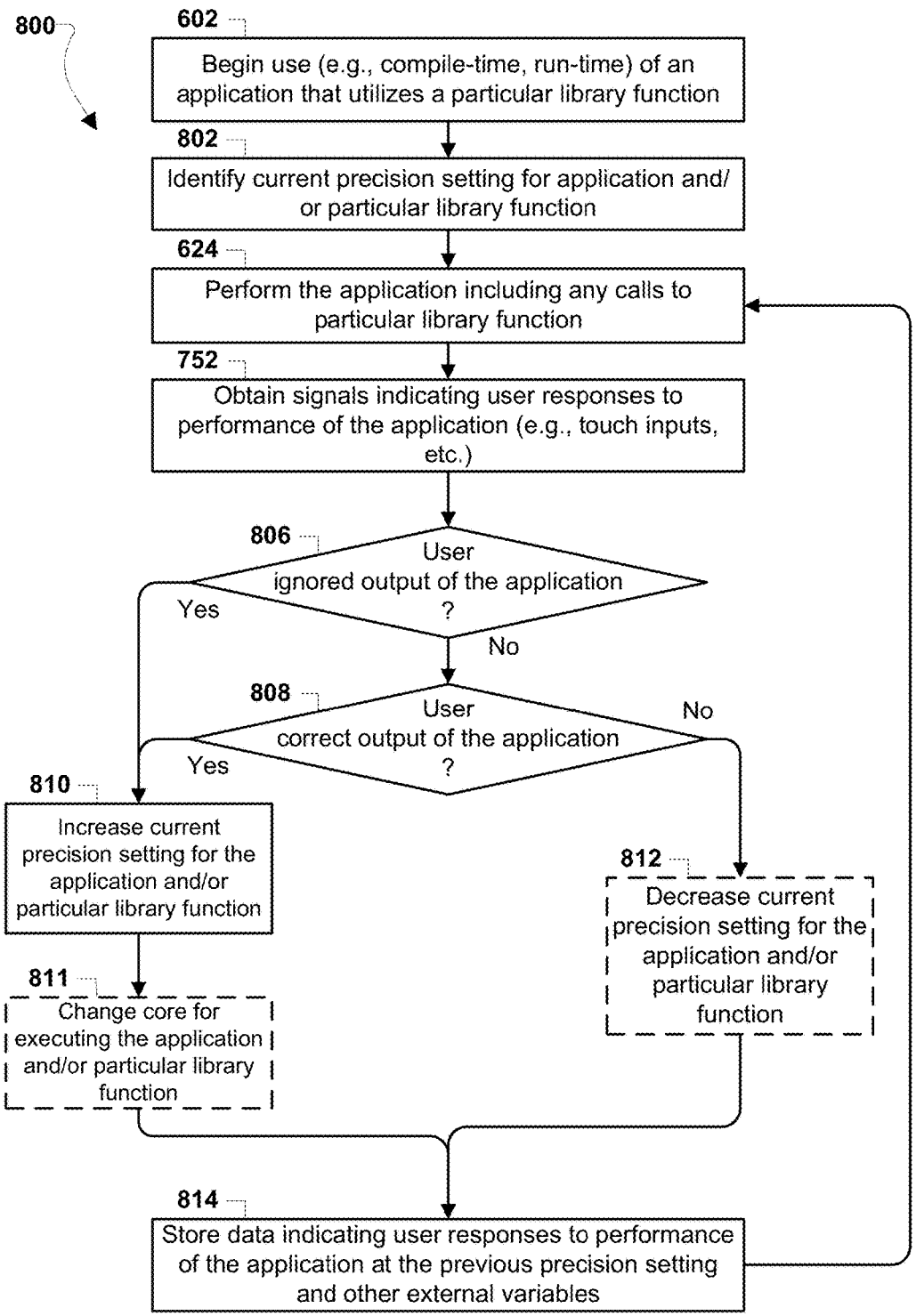
FIGS. 8A-8B are process flow diagrams illustrating aspect methods for a computing device to adjust precision configurations of an application and/or complex algorithms used by the application based on user inputs.

FIG. 8A illustrates an aspect method 800 for a computing device to adjust precision configurations of an application and/or the complex algorithms used by the application based on user inputs. The method 800 may be similar to the method 750 described above, except that the method 800 may be focused on adjusting precision or accuracy configurations of the application and/or the complex algorithms (i.e., library functions) used by the application. For example, in response to receiving user inputs indicating a user is not tolerating the level of accuracy and/or precision of library function results (e.g., face tagging accuracy), the computing device may change the precision or accuracy configuration of the library function in order to cause more acceptable face tagging results in subsequent operations of the application.

The processor of the computing device may perform the operations of block 602 as described above for like numbered block with reference to FIG. 6A. In block 802, the processor of the computing device may identify a current precision setting for the application and/or the particular library function, such as by querying stored data associated with the library function and/or the application. As described above for like numbered block with reference to FIG. 6A, in block 624, the processor of the computing device may perform the application including any calls to the particular library function. The processor of the computing device may perform signal obtaining operations in block 752 as described above for like numbered block with reference to FIG. 7B.

In determination block 806, the processor of the computing device may determine whether the user ignored the output of the application based on the obtained signals indicated the user responses. For example, the computing device may determine whether any user responses (e.g., button clicks, etc.) were received within a certain time period after the completion and presentation of results related to the library function. Ignoring such results may indicate that the user does not pay heed to the results due to irrelevance or inaccuracies. In response to determining that the user has not ignored the output of the application based on the obtained signals indicated the user responses (i.e., determination block 806="No"), the processor of the computing device may determine whether the user has corrected the output of the application (e.g., output as provided via the library function) based on the obtained signals indicated the user responses in determination block 808. For example, the computing device may evaluate inputs received after presenting results to identify whether the user has hit "backspace," "delete," provided overwriting information, and/or other inputs that may be considered corrections or deletions to the results. In response to determining the user has not corrected the output of the application based on the obtained signals indicated the user responses (i.e., determination block 808="No"), the processor of the computing device may decrease the current precision setting for the application and/or the particular library function in optional block 812, such as by changing a stored setting or variable associated with the library function to indicate that cheaper but less accurate or precise calculations may be made in subsequent performances of the function in order to same time and/or energy.

In response to determining the user has corrected the output of the application based on the obtained signals indicated the user responses (i.e., determination block 808="Yes") or in response to determining that the user has ignored the output (i.e., determination block 806="Yes"), the processor of the computing device may increase the current precision setting for the application and/or the particular library function in block 810, such as by changing stored configuration variable values to indicate that future calculations should utilize a higher precision and thus require more time and/or processing resources. In optional block 811, the processor of the computing device may change the processing core used for executing the application (e.g., a portion of the application, etc.) and/or the particular library function, such as by changing an execution core setting associated with the application and/or the library function. For example, the computing device may change an execution core setting (e.g., a stored variable, flag, etc.) to indicate that future executions of the library function should be handled on a different and/or specific core within the computing device (e.g., DSP, GPU, etc.).

In response to performing the operations of optional block 811 or optional block 812, the processor of the computing device may store data indicating the user responses to the performance of the application at the previous precision setting and other external variables in block 814. The operations in block 814 may be similar to those of block 760 as described above for like numbered block with reference to FIG. 7B, except that the operations in block 814 are explicitly related to precision settings. The computing device may repeat the operations the method 800 beginning with performing the application including any calls to the particular library function in block 624.

Figure 8B:
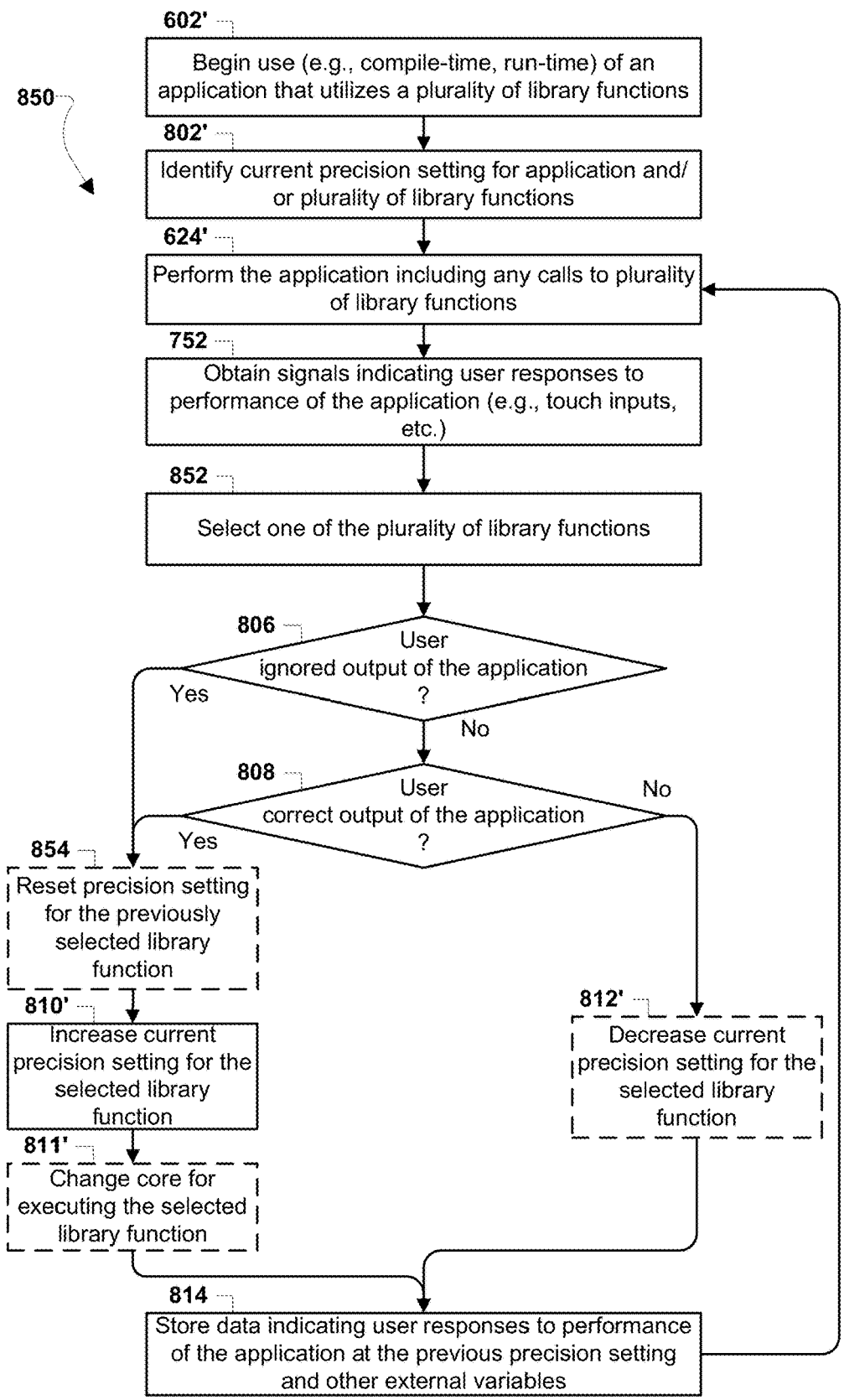

FIG. 8B illustrates an aspect method 850 for a computing device to adjust precision configurations of an application and/or the complex algorithms used by the application based on user inputs. The method 850 is similar to the method 800 described above with reference to FIG. 8A, except that the method 850 includes operations that indicate that any of a plurality of library functions associated with the executing application may be adjusted based on user inputs. In other words, the computing device may continually make intelligent selections of individual library functions to adjust in order to improve a user's tolerance of the execution of the application. In some aspects, such selections may be based on a predefined list or cloud-sourced information regarding the best selection for improving a user's experience during the execution of the application. For example, if there is cloud-based access to an ensemble of users' experiences on many devices executing the same application, the computing device may benefit from the cloud's exhaustive processing of various user experiences to identify a potentially most effective adjustment. In some aspects, selections may be made based on user hints, such as indicated via trade-off functionalities as described herein.

In block 602', the processor of the computing device may begin use (e.g., compile-time, run-time) of an application that utilizes a plurality of library functions. In block 802', the processor of the computing device may identify a current precision setting for application and/or each of the plurality of library functions. In block 624', the processor of the computing device may perform the application including any calls to plurality of library functions. The operations of blocks 602', 802', and 624' may be similar to the operations of blocks 602, 802, and 624 described above, except that blocks 602', 802', and 624' regard a plurality of library functions utilized in association with the application. As described above for like numbered block with reference to FIG. 7B, in block 752, the processor of the computing device may obtain signals indicating user responses to the performance of the application (e.g., touch inputs, etc.). In block 852, the processor of the computing device may select one of the plurality of library functions. For example, the computing device may utilize a queue, list, or other scenario for choosing the next library function to select.

The processor of the computing device may perform operations of determination blocks 806-808 as described above for like numbered blocks with reference to FIG. 8A. In response to determining that the user has ignored the output of the application based on the user inputs (i.e., determination block 806="Yes") or in response to determining that the user has corrected the output of the application based on the user inputs (i.e., determination block 808="Yes"), the processor of the computing device may reset the precision setting for the previously selected library function in optional block 854. In block 810', the processor of the computing device may increase the current precision setting for the selected library function. The operations of block 810' are similar to those of block 810 described above, except the computing device may increase the precision setting for a selected one of the plurality of library functions. In optional block 811', the processor of the computing device may change the processing core for executing the selected library function. The operations of optional block 811' are similar to those of optional block 811 described above, except the computing device may change the processing core for a selected one of the plurality of library functions.

In response to determining that the user has not corrected the output of the application (i.e., determination block 808="No"), the processor of the computing device may decrease the current precision setting for the selected library function in optional block 812'. The operations of optional block 812' may be optional as the precision setting may already be at a default or lowest setting. In response to performing the operations of optional block 811' or optional block 812', the computing device may perform the operations of block 814 as described above for like numbered block with reference to FIG. 8A, and repeat the operations of the method 850 by performing the application including calls to the particular library function in block 624'.

Figure 9A:
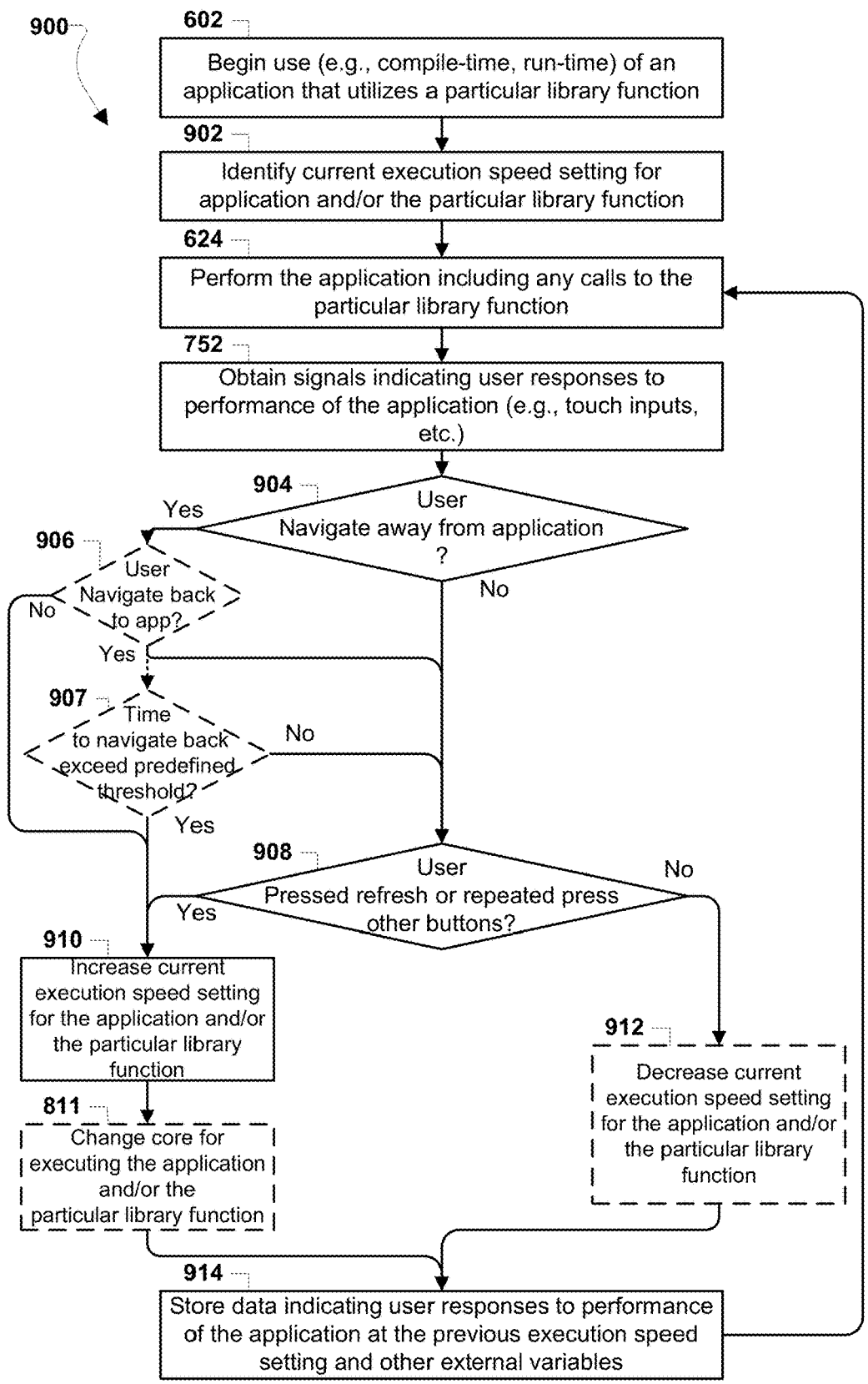
FIGS. 9A-9B are process flow diagrams illustrating aspect methods for a computing device to adjust execution speed configurations of an application and/or complex algorithms used by the application based on user inputs.

FIG. 9A illustrates an aspect method 900 for a computing device to adjust execution speed configurations of an application and/or the complex algorithms used by the application based on user inputs. In various aspects, the method 900 may be performed by the computing device to make adjustments to the application and/or one or more complex algorithms (referred to below simply as library functions) based on user inputs received over time that imply the adequacy of configurations of the application and/or the library functions. The method 900 may be similar to the method 800 described above, except that the method 900 addresses adjustments to execution speed configurations as opposed to precision configurations.

The processor of the computing device may perform the operations of block 602 as described above for like numbered block with reference to FIG. 6A. In block 902, the processor of the computing device may identify a current execution speed setting for the application and/or the particular library function. The processor of the computing device may perform the operations of block 624 as described above for like numbered block with reference to FIG. 6A, and perform the operations of block 752 as described above for like numbered block with reference to FIG. 7B. In determination block 904, the processor of the computing device may determine whether the user has navigated away from the application based on the obtained signals indicating user responses. For example, user inputs may be evaluated to identify whether the user has clicked on graphical elements to cause other applications to launch, elements that cause a focus of the operating system to change to a different application, etc.

In response to determining the user has navigated away from the application (i.e., determination block 904="Yes"), the processor of the computing device may determine whether the user has navigated back to the application based on the obtained signals indicating user responses in optional determination block 906. For example, the computing device may evaluate touch inputs to identify whether the user has clicked back on the application after having previously switched focus to another application. In some aspects, in response to determining that the user has navigated back to the application (i.e., optional determination block 906="Yes"), the processor of the computing device may determine whether the time the user takes to navigate back to the application exceeds a predefined time threshold in optional determination block 907. For example, the computing device may identify the amount of time the user was away from the application (e.g., using another application, etc.) and compare that away time to an amount of time (e.g., seconds, milliseconds, etc.) established as a baseline for the user's annoyance or acceptance of system performance. In response to determining that the user exceeded the predefined threshold time before navigating back to the application, the computing device may determine that the performance of the application needs to be improved to satisfy the user.

In response to determining the user has not navigated away from the application (i.e., determination block 904="No"), or in response to determining that the user has navigated back to the application (i.e., optional determination block 906="Yes"), or in response to determining that the time for the user to navigate back to the application has not exceeded the predefined threshold (i.e., optional determination block 907="No"), the processor of the computing device may determine whether the user has pressed refresh (e.g., a refresh functionality) or repeatedly pressed other buttons based on the obtained signals or user responses in determination block 908. The computing device processor may utilize a predefined threshold for evaluating the number of inputs that exceed normal clicks/inputs to identify interactions that are inconsistent with typical use.

In response to determining that the user has pressed refresh or repeatedly pressed other buttons (i.e., determination block 908="Yes"), or in response to determining that the user has not navigated back to the application (i.e., optional determination block 906="No"), or in response to determining that the time for the user to navigate back to the application has exceeded the predefined threshold (i.e., optional determination block 907="Yes"), the processor of the computing device may increase the current execution speed setting for the application and/or the particular library function in block 910, such as by setting a variable value associated with the library function. In other words, by increasing the execution speed, the time to execute (or complete execution of) the application may be decreased since the user is likely unsatisfied with the current configuration. In optional block 811, the processor of the computing device may change the core for executing the application and/or the particular library function.

In response to determining that the user has not pressed refresh or repeatedly pressed other buttons (i.e., determination block 908="No"), the processor of the computing device may decrease the current execution speed setting for the application and/or the particular library function in optional block 912. In other words, by decreasing the execution speed, the time to execute (or complete execution of) the application may be increased since the user is likely satisfied with the current configuration. The operations of optional block 912 may be optional when the execution speed for the application and the particular library function is already at a minimum execution speed.

In response to performing either the operations of optional block 911 or optional block 912, the processor of the computing device may store data indicating the user responses to performance of the application at the previous execution speed setting and other external variables in block 914. The processor of the computing device may perform operations of block 914 similar to those of block 760 of the method 750 described above with reference to FIG. 7B, except that the operations in block 914 are related to execution speed settings. The computing device may repeat the operations the method 900 beginning with performing the application including any calls to the particular library function in block 624.

Figure 9B:
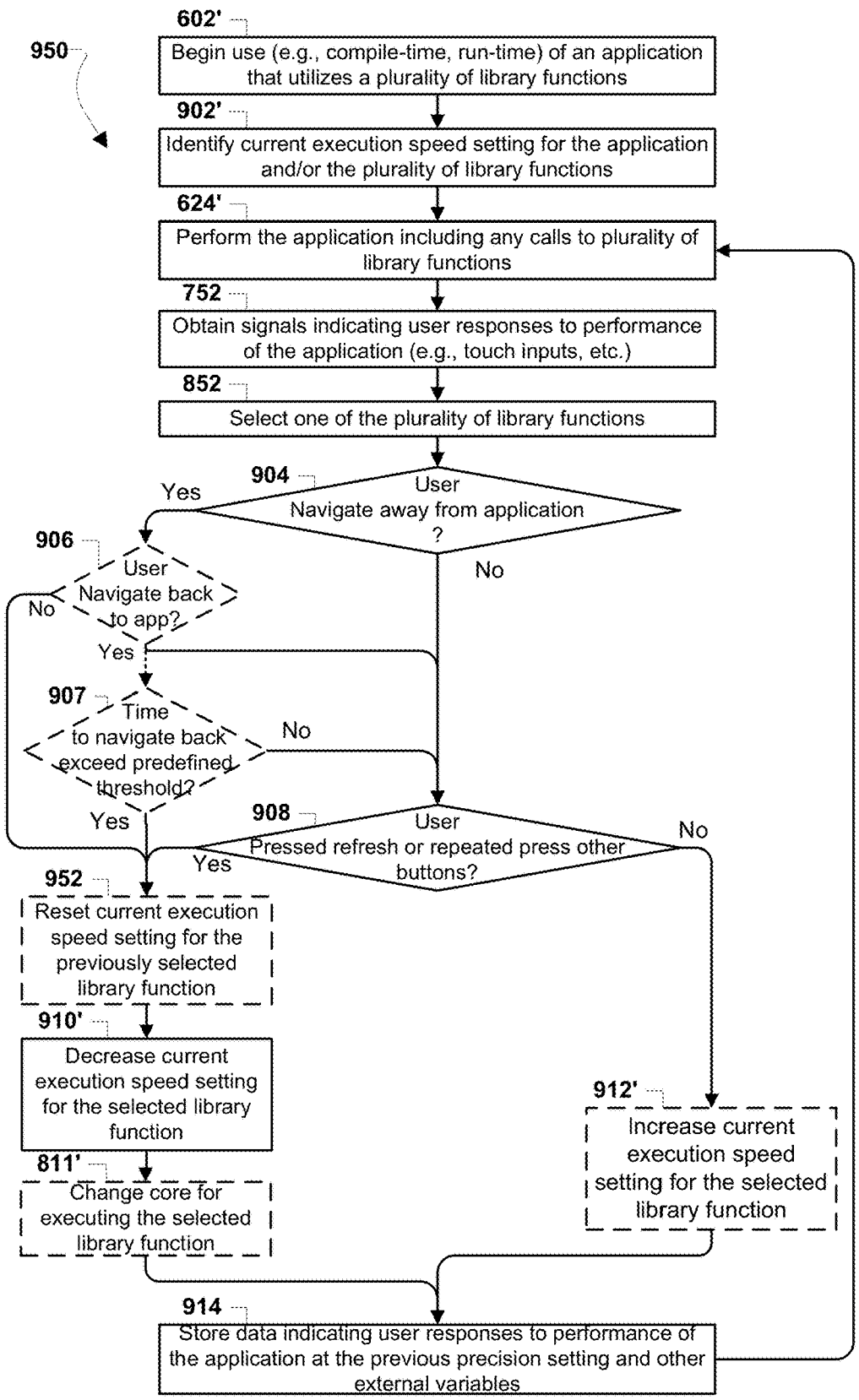
Figure 10:
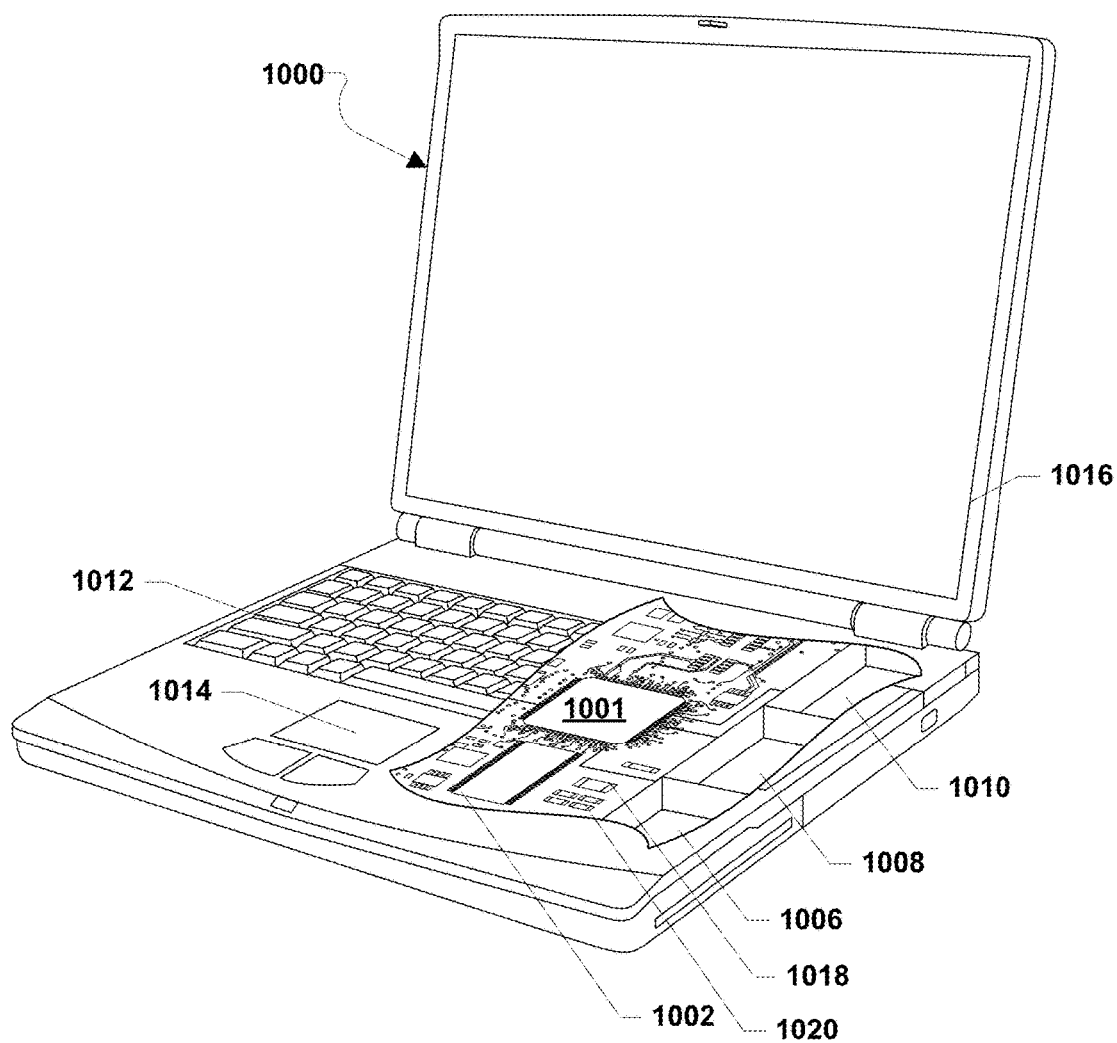
FIG. 10 is a component block diagram of an example laptop computing device suitable for use with the various aspects.

FIG. 9B illustrates an aspect method 950 for a computing device to adjust execution speed configurations of an application and/or the complex algorithms used by the application based on user inputs. The method 950 is similar to the method 900 described above with reference to FIG. 9A, except that the method 950 includes operations that indicate that any of a plurality of library functions associated with the executing application may be adjusted based on user inputs. Further, the method 950 may be similar to the method 850 described above, except that the method 950 addresses adjustments to execution speed configurations as opposed to precision configurations.

The computing device processor may perform the operations of block 602' as described above for the like numbered block with reference to FIG. 8B. In block 902', the processor of the computing device may identify a current execution setting for the application and/or each of the plurality of library functions. The operations of block 902' may be similar to the operations of block 902 described above, except that block 902' regards a plurality of library functions utilized in association with the application. The computing device may perform the operations of block 624' 6A as described above for the like numbered block with reference to FIG. 8B, perform the operations of block 752 as described above with reference to FIG. 7B, perform the operations of block 852 as described above with reference to FIG. 8B, and perform the operations of determination blocks 904-908 as described above with reference to FIG. 9A.

In response to determining that the user has not navigated back to the application (i.e., optional determination block 906="No"), or in response to determining that the time for the user to navigate back to the application has exceeded the predefined threshold (i.e., optional determination block 907="Yes"), or in response to determining that the user has pressed refresh or repeatedly pressed other buttons (i.e., determination block 908="Yes"), the processor of the computing device may reset the current execution speed setting for the previously selected library function in optional block 952, and decrease the current execution speed setting for the selected library function in block 910'. In other words, the optional operations of optional block 952 may be performed in order to undo a previously unsuccessful re-configuration of the previously selected library function. In some aspects, the computing device may simply leave previous re-configurations and move to the next library function to attempt to find an adjustment that improves the user's experience. In optional block 811', the processor of the computing device may change the core for executing the selected library function as described above with reference to FIG. 8B.

In response to determining that the user has not pressed refresh or repeatedly pressed other buttons (i.e., determination block 908="No"), the processor of the computing device may increase the current execution speed setting for the selected library function in optional block 912'. In response to performing the operations of optional block 811' or optional block 912', the processor of the computing device may store data indicating the user responses to performance of the application at the previous execution speed setting and other external variables in block 914. The computing device may repeat the operations the method 950 beginning with performing the application including any calls to the particular library function in block 624'.

Various forms of computing devices, including personal computers and laptop computers, may be used to implement the various aspects, including the aspects described above with reference to FIGS. 2-9B. An example laptop computing device 1000 that may be used to implement the various aspects, including the aspects described above with reference to FIGS. 2-9B. Many laptop computing devices 1000 include a touch pad touch surface 1014 that serves as the computer's pointing device, and thus may receive drag, scroll, and flick gestures similar to those implemented on mobile computing devices equipped with a touch screen display. Such a laptop computing device 1000 generally includes a processor 1001 coupled to volatile internal memory 1002 and a large capacity nonvolatile memory, such as a disk drive 1006. The laptop computing device 1000 may also include a compact disc (CD) and/or DVD drive 1008 coupled to the processor 1001. The laptop computing device 1000 may also include a number of connector ports 1010 coupled to the processor 1001 for establishing data connections or receiving external memory devices, such as a network connection circuit for coupling the processor 1001 to a network. The laptop computing device 1000 may have one or more short-range radio signal transceivers 1018 (e.g., Peanut®, Bluetooth®, ZigBee®, Wi-Fi®, RF radio) and antennas 1020 for sending and receiving wireless signals as described herein. The transceivers 1018 and antennas 1020 may be used with the above-mentioned circuitry to implement the various wireless transmission protocol stacks/interfaces. In a laptop or notebook configuration, the computer housing may include the touch pad touch surface 1014, the keyboard 1012, and the display 1016 all coupled to the processor 1001. Other configurations of the laptop computing device 1000 may include a computer mouse or trackball coupled to the processor (e.g., via a USB input) as are well known, which may also be used in conjunction with the various aspects.

Figure 11:
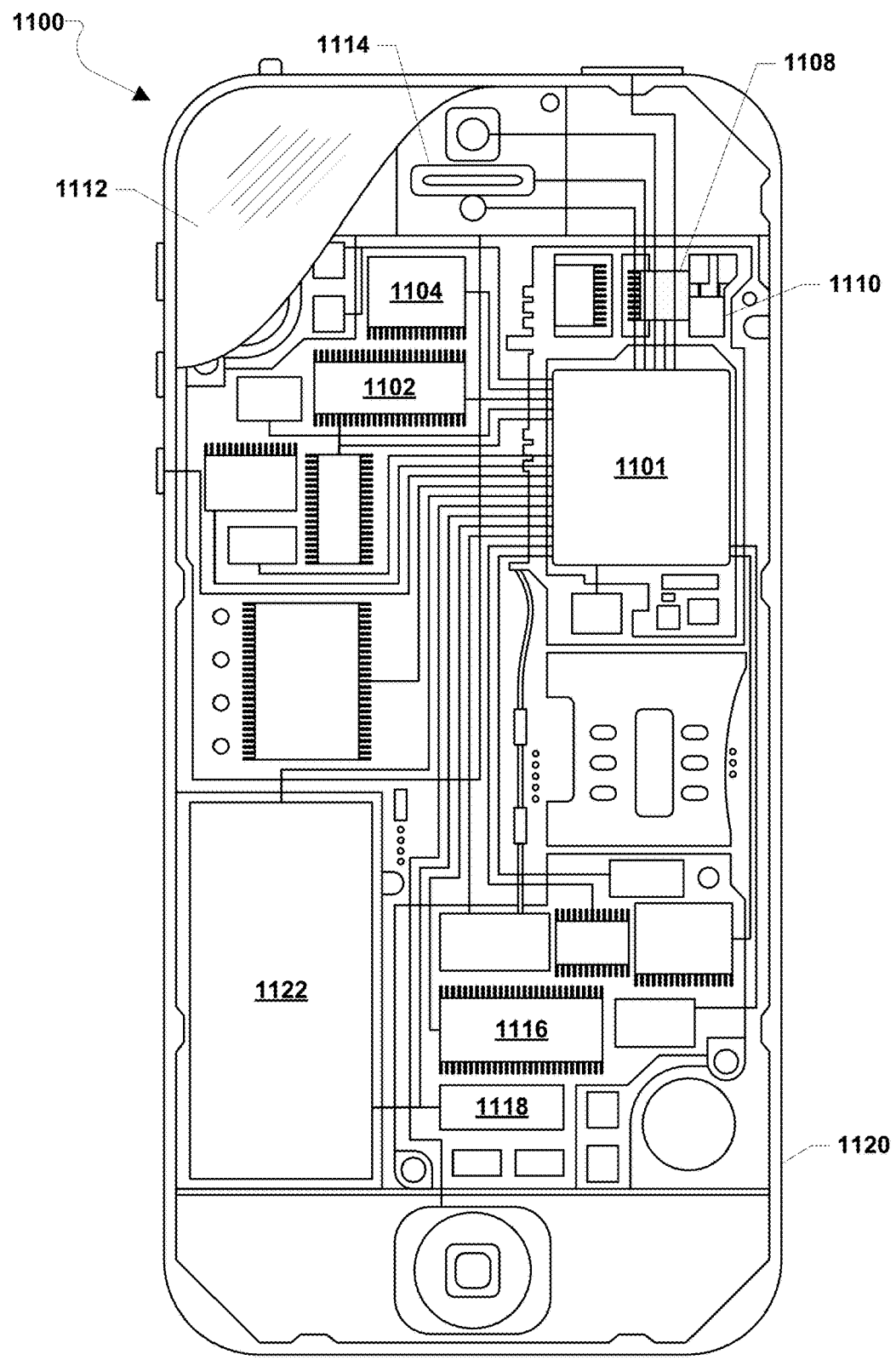
FIG. 11 is a component block diagram of a mobile computing device suitable for use in an aspect.

An example of a multicore mobile device 1100 that may be used to implement the various aspects, including the aspects described above with reference to FIGS. 2-9B, is illustrated in FIG. 11. In various aspects, the multicore mobile device 1100 may include a processor 1101 coupled to a touch screen controller 1104 and an internal memory 1102. The processor 1101 may be one or more multicore integrated circuits (ICs) designated for general or specific processing tasks. The internal memory 1102 may be volatile or non-volatile memory, and may also be secure and/or encrypted memory, or unsecure and/or unencrypted memory, or any combination thereof. The touch screen controller 1104 and the processor 1101 may also be coupled to a touch screen panel 1112, such as a resistive-sensing touch screen, capacitive-sensing touch screen, infrared sensing touch screen, etc. The multicore mobile device 1100 may have one or more radio signal transceivers 1108 (e.g., Bluetooth®, ZigBee®, Wi-Fi®, RF radio) and antennae 1110, for sending and receiving, coupled to each other and/or to the processor 1101. The transceivers 1108 and antennae 1110 may be used with the above-mentioned circuitry to implement the various wireless transmission protocol stacks and interfaces. The multicore mobile device 1100 may include a cellular network wireless modem chip 1116 that enables communication via a cellular network and is coupled to the processor. The multicore mobile device 1100 may include a peripheral device connection interface 1118 coupled to the processor 1101. The peripheral device connection interface 1118 may be singularly configured to accept one type of connection, or multiply configured to accept various types of physical and communication connections, common or proprietary, such as USB, FireWire, Thunderbolt, or PCIe. The peripheral device connection interface 1118 may also be coupled to a similarly configured peripheral device connection port (not shown). The multicore mobile device 1100 may also include speakers 1114 for providing audio outputs. The multicore mobile device 1100 may also include a housing 1120, constructed of a plastic, metal, or a combination of materials, for containing all or some of the components discussed herein. The multicore mobile device 1100 may include a power source 1122 coupled to the processor 1101, such as a disposable or rechargeable battery. The rechargeable battery may also be coupled to the peripheral device connection port to receive a charging current from a source external to the multicore mobile device 1100.

The various processors described herein may be any programmable microprocessor, microcomputer or multiple processor chip or chips that can be configured by software instructions (applications) to perform a variety of functions, including the functions of the various aspects described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various aspects, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for dynamically configuring complex algorithms associated with applications executing on a computing device, comprising:

performing, via a processor of the computing device, an application that calls a library function associated with a complex algorithm;

obtaining, via the processor, signals indicating user responses to performance of the application;

determining, via the processor, whether a user tolerates the performance of the application based on the obtained signals indicating the user responses;

adjusting, via the processor, a configuration of the application to improve a subsequent performance of the application in response to determining the user does not tolerate the performance of the application;

adjusting, via the processor, a floating point setting of the library function to a less precise floating point to decrease the subsequent performance of the application in response to determining the user tolerates the performance of the application; and storing, via the processor, data indicating the user responses to the performance of the application and other external variables for use in subsequent evaluations of user inputs.

2. The method of claim 1, wherein the performance of the application includes at least one of an execution speed to achieve results, an accuracy of the results, and a precision of the results.

3. The method of claim 1, wherein the obtained signals indicating the user responses are one or more of touch inputs on a touch screen, button presses, data from sensors, a launch of another application, a change in a state of the application, and an absence of a user input when a user response would be expected.

4. The method of claim 1, wherein determining, via the processor, whether the user tolerates the performance of the application based on the obtained signals indicating the user responses comprises one or more of:
  determining, via the processor, whether the user has ignored output of the application based on the obtained signals; and
  determining, via the processor, whether the user has corrected the output of the application based on the obtained signals.

5. The method of claim 1, wherein determining, via the processor, whether the user tolerates the performance of the application based on the obtained signals indicating the user responses comprises one or more of:
  determining, via the processor, whether the user has navigated away from the application based on the obtained signals; and
  determining, via the processor, whether the user has pressed a refresh functionality or repeatedly pressed other buttons based on the obtained signals.

6. The method of claim 5, further comprising:
  determining, via the processor, whether the user has navigated back to the application in response to determining the user has navigated away from the application based on the obtained signals.

7. The method of claim 6, further comprising:
  determining, via the processor, whether the user has navigated back to the application within a predefined time threshold in response to determining the user has navigated back to the application.

8. The method of claim 1, wherein adjusting, via the processor, the configuration of the application to improve the subsequent performance of the application in response to determining the user does not tolerate the performance of the application comprises one or more of:
  increasing, via the processor, a precision setting of the application;
  increasing, via the processor, an execution speed setting; and
  changing, via the processor, an execution core setting.

9. The method of claim 1, wherein adjusting, via the processor, the configuration of the application to improve the subsequent performance of the application in response to determining the user does not tolerate the performance of the application comprises adjusting, via the processor, the configuration of the application for using the library function in response to determining the user does not tolerate the performance of the application.

10. The method of claim 1, further comprising adjusting, via the processor, the configuration of the application to lower the subsequent performance of the application in response to determining the user tolerates the performance of the application.

11. The method of claim 1, wherein the application calls a plurality of library functions, wherein the library function is within the plurality of library functions, the method further comprising:
  selecting, via the processor, a first library function of the plurality of library functions;
  adjusting, via the processor, a configuration of the first library function to improve the subsequent performance of the application in response to determining the user does not tolerate the performance of the application based on the obtained signals indicating the user responses;
  subsequently performing, via the processor, the application;
  obtaining, via the processor, subsequent signals indicating subsequent user responses to the subsequent performance of the application;
  selecting, via the processor, a second library function of the plurality of library functions in response to determining the user does not tolerate the subsequent performance of the application; and
  adjusting, via the processor, a configuration of the second library function.

12. The method of claim 1, further comprising:
  obtaining, via the processor of the computing device, a plurality of trade-off settings for the application;
  evaluating, via the processor, conditions associated with the computing device at an initial time; and
  determining, via the processor, whether a trade-off setting of the obtained plurality of trade-off settings is to be utilized based on the evaluated conditions associated with the computing device at the initial time.

13. The method of claim 12, further comprising:
  adjusting, via the processor, an initial configuration of the application based on the trade-off setting in response to determining that the trade-off setting is to be utilized based on the evaluated conditions associated with the computing device at the initial time.

14. The method of claim 13, wherein
  adjusting, via the processor, the configuration of the application to improve the subsequent performance of the application in response to determining the user does not tolerate the performance of the application comprises overwriting, via the processor, the initial configuration of the application in response to determining that the user does not tolerate the performance of the application using the initial configuration.

15. The method of claim 12, wherein obtaining, via the processor of the computing device, the plurality of trade-off settings for the application comprises at least one of:
  obtaining, via the processor, a first trade-off settings for the application via an application programming interface (API) call during run-time of the application;
  obtaining, via the processor, a second trade-off settings for the application via an in-code directive; and
  obtaining, via the processor, a third trade-off settings for the application via a special register.

16. The method of claim 12, wherein evaluating, via the processor, conditions associated with the computing device at the initial time comprises at least one of:
  evaluating, by the processor, a workload for the application; and
  evaluating, by the processor, external conditions affecting processing of the application by the computing device.

17. A computing device, comprising a processor configured with processor-executable instructions to perform operations comprising:
 performing an application that calls a library function associated with a complex algorithm;
 obtaining signals indicating user responses to performance of the application;
 determining whether a user tolerates the performance of the application based on the obtained signals indicating the user responses;
 adjusting a configuration of the application to improve a subsequent performance of the application in response to determining the user does not tolerate the performance of the application;
 adjusting a floating point setting of the library function to a less precise floating point to decrease the subsequent performance of the application in response to determining the user tolerates the performance of the application; and
 storing data indicating the user responses to the performance of the application and other external variables for use in subsequent evaluations of user inputs.

18. The computing device of claim 17, wherein the processor is configured with processor-executable instructions to perform operations such that determining whether the user tolerates the performance of the application based on the obtained signals indicating the user responses comprises one or more of:
 determining, via the processor, whether the user has ignored output of the application based on the obtained signals; and
 determining, via the processor, whether the user has corrected the output of the application based on the obtained signals.

19. The computing device of claim 17, wherein the processor is configured with processor-executable instructions to perform operations such that determining, via the processor, whether the user tolerates the performance of the application based on the obtained signals indicating the user responses comprises one or more of:
 determining whether the user has navigated away from the application based on the obtained signals; and
 determining whether the user has pressed a refresh functionality or repeatedly pressed other buttons based on the obtained signals.

20. The computing device of claim 19, wherein the processor is configured with processor-executable instructions to perform operations further comprising:
 determining whether the user has navigated back to the application in response to determining the user has navigated away from the application based on the obtained signals.

21. The computing device of claim 20, wherein the processor is configured with processor-executable instructions to perform operations further comprising:
 determining whether the user has navigated back to the application within a predefined time threshold in response to determining the user has navigated back to the application.

22. The computing device of claim 17, wherein the processor is configured with processor-executable instructions to perform operations such that adjusting the configuration of the application to improve the subsequent performance of the application in response to determining the user does not tolerate the performance of the application comprises one or more of:
 increasing a precision setting of the application;
 increasing an execution speed setting; and
 changing an execution core setting.

23. The computing device of claim 17, wherein the processor is configured with processor-executable instructions to perform operations such that adjusting the configuration of the application to improve the subsequent performance of the application in response to determining the user does not tolerate the performance of the application comprises adjusting the configuration of the application for using the library function in response to determining the user does not tolerate the performance of the application.

24. The computing device of claim 17, wherein the processor is configured with processor-executable instructions to perform operations further comprising adjusting the configuration of the application to lower the subsequent performance of the application in response to determining that the user does tolerate the performance of the application.

25. The computing device of claim 17, wherein the processor is configured with processor-executable instructions to perform operations such that the application calls a plurality of library functions, wherein the library function is within the plurality of library functions, wherein the processor is configured with processor-executable instructions to perform operations further comprising:
 selecting a first library function of the plurality of library functions;
 adjusting a configuration of the first library function to improve the subsequent performance of the application in response to determining the user does not tolerate the performance of the application based on the obtained signals indicating the user responses;
 subsequently performing the application;
 obtaining subsequent signals indicating subsequent user responses to the subsequent performance of the application;
 selecting a second library function of the plurality of library functions in response to determining the user does not tolerate the subsequent performance of the application; and
 adjusting a configuration of the second library function.

26. The computing device of claim 17, wherein the processor is configured with processor-executable instructions to perform operations further comprising:
 obtaining a plurality of trade-off settings for the application;
 evaluating conditions associated with the computing device at an initial time; and determining whether a trade-off setting of the obtained plurality of trade-off settings is to be utilized based on the evaluated conditions associated with the computing device at the initial time.

27. A computing device, comprising:
 means for performing an application that calls a library function associated with a complex algorithm;
 means for obtaining signals indicating user responses to performance of the application;
 means for determining whether a user tolerates the performance of the application based on obtained signals indicating the user responses;
 means for adjusting a configuration of the application to improve a subsequent performance of the application in response to determining the user does not tolerate the performance of the application;
 means for adjusting a floating point setting of the library function to a less precise floating point to decrease the subsequent performance of the application in response to determining the user tolerates the performance of the application; and means for storing data indicating the user responses to the performance of the application and other external variables for use in subsequent evaluations of user inputs.

28. A non-transitory processor-readable storage medium having stored thereon processor-executable instructions configured to cause a processor of a computing device to perform operations comprising:

performing an application that calls a library function associated with a complex algorithm;

obtaining signals indicating user responses to performance of the application;

determining whether a user tolerates the performance of the application based on the obtained signals indicating the user responses;

adjusting a configuration of the application to improve a subsequent performance of the application in response to determining the user does not tolerate the performance of the application;

adjusting a floating point setting of the library function to a less precise floating point to decrease the subsequent performance of the application in response to determining the user tolerates the performance of the application; and storing data indicating the user responses to the performance of the application and other external variables for use in subsequent evaluations of user inputs.

* * * * *